(12) United States Patent
Wang et al.

(10) Patent No.: US 11,974,320 B2
(45) Date of Patent: Apr. 30, 2024

(54) METHODS PROVIDING CONTROL SIGNALING AND RELATED WIRELESS DEVICES AND NETWORK NODES

(71) Applicant: Telefonaktiebolaget LM Ericsson (publ), Stockholm (SE)

(72) Inventors: Min Wang, Luleå (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

(21) Appl. No.: 17/434,462

(22) PCT Filed: Oct. 29, 2019

(86) PCT No.: PCT/SE2019/051079
§ 371 (c)(1),
(2) Date: Aug. 27, 2021

(87) PCT Pub. No.: WO2020/176022
PCT Pub. Date: Sep. 3, 2020

(65) Prior Publication Data
US 2022/0141872 A1 May 5, 2022

Related U.S. Application Data

(60) Provisional application No. 62/811,307, filed on Feb. 27, 2019.

(51) Int. Cl.
*H04W 74/08* (2009.01)
*H04W 72/044* (2023.01)
(Continued)

(52) U.S. Cl.
CPC ..... *H04W 74/0816* (2013.01); *H04W 72/044* (2013.01); *H04W 74/002* (2013.01); *H04W 74/0841* (2013.01); *H04W 74/0866* (2013.01)

(58) Field of Classification Search
CPC ............. H04W 74/0816; H04W 72/20; H04W 74/002; H04W 74/02; H04W 72/044; H04W 74/841; H04W 74/0866
See application file for complete search history.

(56) References Cited

U.S. PATENT DOCUMENTS

| | | | |
|---|---|---|---|
| 2021/0251010 A1 | 8/2021 | Zhu | |
| 2022/0150917 A1* | 5/2022 | Wang | H04W 16/14 |
| 2022/0232546 A1* | 7/2022 | Hakola | H04W 24/08 |

FOREIGN PATENT DOCUMENTS

| | | |
|---|---|---|
| CN | 108886789 A | 8/2021 |
| WO | WO 2017070055 A1 | 4/2017 |

OTHER PUBLICATIONS

International Search Report and Written Opinion of the International Searching Authority, PCT/SE2019/051079, dated Jan. 16, 2020, 10 pages.

(Continued)

*Primary Examiner* — Sulaiman Nooristany
(74) *Attorney, Agent, or Firm* — Sage Patent Group

(57) ABSTRACT

Methods are discussed to operate a wireless device in a wireless communication network. Shared channel occupancy time (COT) signaling is received from a Radio Access Network (RAN) node of the wireless communication network. An indication of a control resource is received from the RAN node. An indication of a shared COT switching point defining a switch from shared COT reception to shared COT transmission is received. Control signaling is transmitted to the RAN node using the control resource responsive to receiving the indication of the switching point and the indication of the control resource. Related methods are discussed to operate a Radio Access Network (RAN) node. Related wireless devices and RAN nodes are also discussed.

11 Claims, 16 Drawing Sheets

(51) Int. Cl.
*H04W 74/00* (2009.01)
*H04W 74/0816* (2024.01)
*H04W 74/0833* (2024.01)

(56) References Cited

OTHER PUBLICATIONS

Lenovo et al., 3GPP TSG RAN WG1#96, R1-1902955, "DL Frame Structure and COT Aspects for NR-U," Athens, Greece, Feb. 25-Mar. 1, 2019, 3 pages.
3GPP, $3^{rd}$ Generation Partnership Project; 3GPP TR 38.889 v16.0.0 (Dec. 2018), Technical Specification Group Radio Access Network; Study on NR-based access to unlicensed spectrum (Release 16), 119 pages.
Motorola Mobility et al., 3GPP TSG RAN WG1 Ad-Hoc Meeting 1901, R1-1901354, "Feature lead summary for NR-U DL Signals and Channels," Taipei, Jan. 21-25, 2019, 17 pages.

* cited by examiner

US 11,974,320 B2

METHODS PROVIDING CONTROL SIGNALING AND RELATED WIRELESS DEVICES AND NETWORK NODES

CROSS REFERENCE TO RELATED APPLICATIONS

This application is a 35 U.S.C. § 371 national stage application of PCT International Application No. PCT/SE2019/051079 filed on Oct. 29, 2019, which in turns claims domestic priority to U.S. Provisional Patent Application No. 62/811,307, filed on Feb. 27, 2019, the disclosures and content of which are incorporated by reference herein in their entirety.

TECHNICAL FIELD

The present disclosure relates generally to the field of communications, and more particularly to communication methods and related wireless devices and network nodes supporting wireless communications.

BACKGROUND

In an unlicensed system, uplink UL control signaling transmissions may be delayed within a gNB initiated COT (Channel Occupancy Time), since the UE (also referred to as a wireless device) may have no control resource/occasion available during the UL slot periods within the COT.

Next generation systems are expected to support a wide range of use cases with varying requirements ranging from fully mobile devices to stationary IoT (Internet of Things) or fixed wireless broadband devices. The traffic pattern associated with many use cases is expected to consist of short or long bursts of data traffic with varying lengths of waiting periods in between (here called the inactive state). In NR (New Radio), both license assisted access and standalone unlicensed operation are to be supported in 3GPP. Hence, the procedure of PRACH (Physical Random Access Channel) transmission and/or SR (Scheduling Request) transmission in unlicensed spectrum shall be investigated in 3GPP. In the following, NR-U (New Radio Unlicensed) and channel access procedure for an unlicensed channel based on LBT (Listen Before Talk) is introduced.

In order to address the ever increasing data demand, NR is considered on both licensed and unlicensed spectrum. The standardization work for licensed spectrum in Rel-15 is still on-going. Therefore, 3GPP has defined a study item on NR-based Access to Unlicensed Spectrum that was approved at RAN-77. In this study item, compared to the LTE LAA, NR-U may also need to support DC (Dual Connectivity) and standalone scenarios, where the MAC (Medium Access Control) procedures including RACH (Random Access Channel) and scheduling procedure on unlicensed spectrum may be subject to the LBT failures, while there was no such restriction in LTE LAA, since there was licensed spectrum in the LAA scenario so that the RACH and scheduling related signaling can be transmitted on the licensed spectrum instead of unlicensed spectrum.

For discovery reference signal (DRS) transmission such as PSS/SSS, PBCH, CSI-RS, control channel transmission such as PUCCH/PDCCH, physical data channel such as PUSCH/PDSCH, and uplink sounding reference signal such as SRS transmission, channel sensing should be applied to determine the channel availability before the physical signal is transmitted using the channel.

The RRM (Radio Resource Management) procedures in NR-U may be generally similar to LAA, since NR-U is aiming to reuse LAA/eLAA/feLAA technologies as much as possible to handle the coexistence between NR-U and other legacy RATs. RRM measurements and report comprising special configuration procedure with respect the channel sensing and channel availability.

Hence, channel access/selection for LAA was an important aspect for co-existence with other RATs such as Wi-Fi. For instance, LAA has aimed to use carriers that are congested with Wi-Fi.

In licensed spectrum, a UE measures Reference Signal Received Power (RSRP), and Reference Signal Received Quality (RSRQ) of the downlink radio channel, and provides the measurement reports to its serving eNB/gNB. However, these measurements may not reflect the interference strength on the carrier. Another metric, Received Signal Strength Indicator (RSSI), can serve for such purpose. At the eNB/gNB side, it may be possible to derive RSSI based on the received RSRP and RSRQ reports, however, this may require that they are available. Due to the LBT failure, some reports in terms of RSRP or RSRP may be blocked (e.g., due to that the reference signal transmission (DRS) being blocked in the downlink or the measurement report being blocked in the uplink). Hence, the measurements in terms of RSSI may be very useful. The RSSI measurements together with the time information concerning when and how long a time that UEs have made the measurements can assist the gNB/eNB to detect a hidden node. Additionally, the gNB/eNB can measure the load situation of the carrier which may be useful for the network to prioritize some channels for load balance and channel access failure reduction/avoidance purposes.

LTE (Long Term Evolution) LAA (Licensed Assisted Access) has been defined to support measurements of averaged RSSI and channel occupancy for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

Channel access procedure in NR unlicensed spectrum are discussed below.

Listen-before-talk (LBT) is designed for unlicensed spectrum co-existence with other RATs. In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before a next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS (Quality of Service) differentiation, a channel access priority based on the service type has been defined. For example, four LBT priority classes are defined for differentiation of contention window sizes (CWS) and MCOT between services.

COT sharing in NR-U is discussed below.

For a node (e.g., NR-U gNB/UE, LTE-LAA eNB/UE, or Wi-Fi AP/STA)) to be allowed to transmit in unlicensed spectrum (e.g., 5 GHz band) it may typically need to perform a clear channel assessment (CCA). This procedure typically includes sensing the medium to be idle for a number of time intervals. Sensing the medium to be idle can be done in different ways, e.g. using energy detection, preamble detection or using virtual carrier sensing, where the latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small time duration (called SIFS or Short InterFrame Space) is introduced between the data transmission and the corresponding feedback which does not include actual sensing of the channel. In 802.11, the SIFS period (16 μs for 5 GHz OFDM PHYs) is defined as:

$$aSIFSTime=aRxPHYDelay+aMACProcessingDelay+aRxTxTurnaroundTime$$

aRxPHYDelay defines the duration needed by the PHY layer to deliver a packet to the MAC layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch the direction from reception to transmission.

It is anticipated that for NR in unlicensed bands (NR-U), a similar gap to accommodate for the radio turnaround time will be allowed. For example, this will enable the transmission of PUCCH carrying UCI feedback as well as PUSCH carrying data and possible UCI within the same transmit opportunity (TXOP) acquired by the initiating gNB without the UE performing clear channel assessment before PUSCH/PUCCH transmission as long as the gap between DL and UL transmission is less than or equal to 16 us. Operation in this manner is typically called "COT sharing." An example on COT sharing is illustrated in FIG. 1.

FIG. 1 illustrates transmission opportunities (TXOP) both with and without COT sharing where CCA is performed by the initiating node (gNB). For the case of COT sharing the gap between downlink DL and uplink UL transmission is less than 16 us.

For NR unlicensed access operation, both RACH and PUCCH-SR signaling may need to be transmitted over unlicensed spectrum cells because a NR-U cell may operate as a primary cell. In unlicensed spectrum, however, Listen Before Talk LBT operations may increase interruption and/or latency for data transmission.

SUMMARY

According to some embodiments of inventive concepts, a method is provided to operate a wireless device in a wireless communication network. Shared channel occupancy time (COT) signaling is received from a Radio Access Network (RAN) node of the wireless communication network. An indication of a control resource is received from the RAN node. An indication of a shared COT switching point defining a switch from shared COT reception to shared COT transmission is received. Control signaling is transmitted to the RAN node using the control resource responsive to receiving the indication of the switching point and the indication of the control resource.

According to some other embodiments of inventive concepts, a method is provided to operate a Radio Access Network (RAN) node in a wireless communication network. Shared channel occupancy time (COT) signaling is transmitted to a wireless device. An indication of a control resource is transmitted to the wireless device. An indication of a shared COT switching point defining a switch from shared COT transmission to shared COT reception is transmitted. Control signaling is received from the wireless device using the control resource after transmitting the indication of the switching point and the indication of the control resource.

Further embodiments of inventive concepts, include wireless devices and RAN nodes corresponding to the above methods.

According to some embodiments of inventive concepts, uplink UL control signaling may be transmitted during a radio access network RAN node (gNB) initiated COT with reduced latency to provide that the gNB receives the UE buffer/service status on time. Moreover, unnecessary listen before talk or clear channel assessment may be reduced to uplink UL control signaling transmissions.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
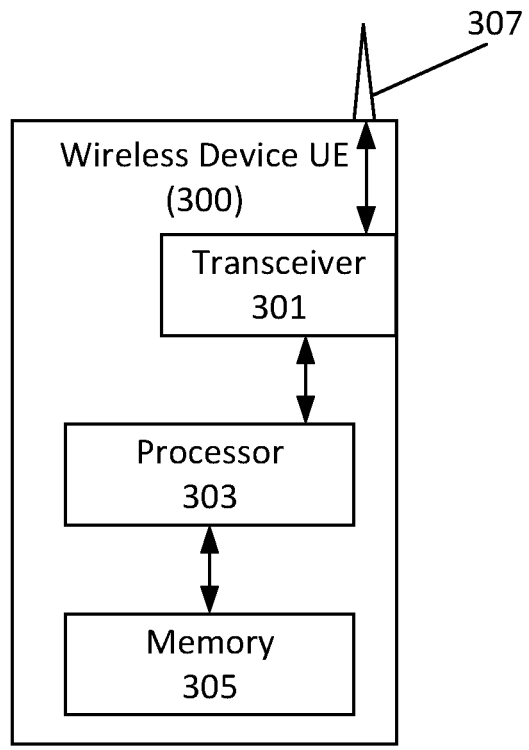
FIG. 3 is a block diagram illustrating a mobile terminal UE according to some embodiments of inventive concepts.

FIG. 3 is a block diagram illustrating elements of a wireless device UE (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. As shown, wireless device UE may include an antenna 307, and transceiver circuitry 301 (also referred to as a transceiver) including a transmitter and a receiver configured to provide uplink and downlink radio communications with a base station(s) of a radio access network. Wireless device UE may also include processing circuitry 303 (also referred to as a processor) coupled to the transceiver circuitry, and memory circuitry 305 (also referred to as memory) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments).

Figure 4:
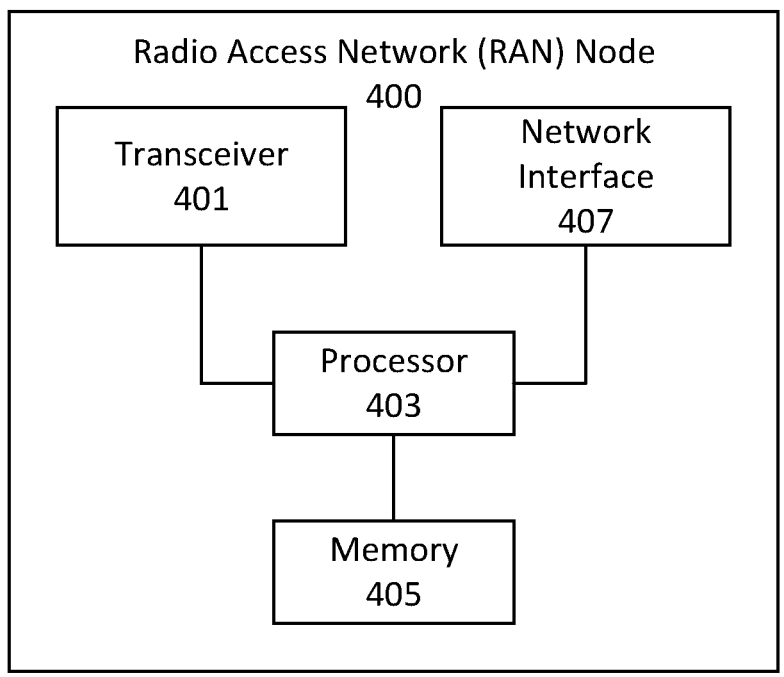
FIG. 4 is a block diagram illustrating a radio access network RAN node (e.g., a base station eNB/gNB) according to some embodiments of inventive concepts.

FIG. 4 is a block diagram illustrating elements of a radio access network node (also referred to as a network node, base station, eNodeB/eNB, gNodeB/gNB, etc.) of a Radio Access Network (RAN) configured to provide cellular communication according to embodiments of inventive concepts. As shown, the RAN node may include a transceiver circuitry 401 (also referred to as a transceiver) including a transmitter and a receiver configured to provide uplink and downlink radio communications with mobile terminals. The network node may include a network interface circuitry 407 (also referred to as a network interface) configured to provide communications with other nodes (e.g., with other base stations) of the RAN and/or core network CN. The network node may also include a processing circuitry 403 (also referred to as a processor) coupled to the transceiver circuitry, and a memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit communications through transceiver 401 over a radio interface to one or more mobile terminals UEs and/or to receive communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments).

According to some other embodiments, a network node may be implemented as a core network CN node without a transceiver. In such embodiments, transmission to a wireless device UE may be initiated by the network node so that transmission to the wireless device is provided through a network node including a transceiver, e.g., through a base station or RAN node. According to embodiments where the network node is a RAN node including a transceiver, initiating transmission may include transmitting through the transceiver.

Figure 5:
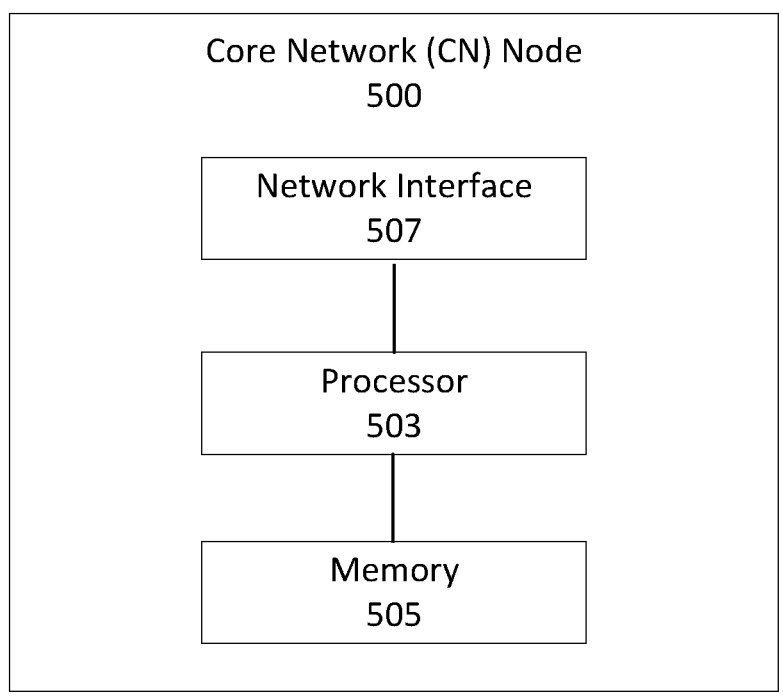
FIG. 5 is a block diagram illustrating a core network node (e.g., an AMF node, an SMF node, etc.) according to some embodiments of inventive concepts.

FIG. 5 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface)

configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments).

In L LAA/eLAA/feLAA, there is no standalone unlicensed spectrum scenario meaning that the UE doesn't need to support RACH and PUCCH-SR (a scheduling request transmitted using a PUCCH channel) transmissions in the unlicensed spectrum cells as secondary cells, since they can basically transmit over the licensed spectrum cells as primary cells.

In the NR unlicensed access work item defined for 3GPP Rel-16, NR unlicensed operation may need to support both standalone and DC scenarios meaning that both RACH and PUCCH-SR signaling may need to be transmitted over unlicensed spectrum cells, since a NR-U cell may operate as a primary cell.

In an unlicensed system, data transmission interruption and latency may be incurred due to LBT operations, which may lead to service QoS degradation for a UE. Therefore, a COT sharing mechanism has been identified to be beneficial to reduce unnecessary LBT operations for NR-U. However, it may be important that the gap between two consecutive transmission bursts is less than a given time period in order to share a COT. For example, as described in the TR 38.889 V 16.0.0, within a gNB-initiated COT, an uplink UL burst for a UE consisting of one or more of PUSCH, PUCCH, PRACH, and SRS follows the channel access schemes. In order for a UE to perform an uplink transmission immediately within a gNB initiated COT, the gap between the beginning of UL data burst and the end of DL burst must be shorter than 16 us.

The COT structure is being discussed in 3GPP. The below proposal has been suggested in the RAN1 discussions in R1-1901354, at 3GPP TSG RAN WG1 Ad-Hoc Meeting 1901 at, 21-25 Jan. 2019.

"FL Proposal:
Discuss what kind of information is required to be transmitted to the UE(s) regarding COT structure and possible enhancements, for which proposed behaviour, and if this should be signaled via PHY or RRC
  DL/UL/flexible symbols (like SFI)
  PDCCH monitoring indicator
  SFI information (start/end/next)
  Occupied bandwidth
  COT Duration, End of COT
  Additional SFI entries for partial slots
  SFI of outside COT
  COT Sharing (e.g. for configured grant sharing)"

The detailed content for COT structure and which signaling shall carry the COT information is still being discussed by RAN1. According to latest discussion progress, it has been highlighted in the 3GPP TR 38.889 v 16.0.0 section 7.2.1.1 that DCI 2_0 can be used for COT structure indication:

"In addition to the functionalities provided by DCI format 2_0 in Rel-15 NR, indication of the COT structure in the time domain has been identified as being beneficial."

In NR Rel-15, GC-PDCCH can be used to indicate to a group of UEs what the instantaneous TDD pattern looks like for the current and potentially for future slots. This is achieved by signaling multiple slot format indicators (SFIs) using DCI Format 2_0 carried by GC-PDCCH.

Therefore, GC-PDCCH may be a signaling means used to carry the COT structure indication.

During a gNB initiated COT, it has been further pointed out in the 3GPP TR 38.889 v 16.0.0 section 7.2.1.1 that:

"Single and multiple DL to UL and UL to DL switching points within a shared gNB COT is identified to be beneficial and can be supported."

This means that both the switch points in time domain and number of switch points in a COT would be also signaled in the COT structure indication.

It would be natural that the gNB that is responsible to control when to allow UEs in a gNB initiated COT to perform a switch from DL to UL transmissions. The gNB has full knowledge on DL buffers, based on which the gNB may partly figure out part of the UL buffer status for a UE, for example, if there is a DL data burst transmitted to a UE, meaning that the UE may soon provide acknowledgement in UL. However, exact knowledge on UL buffer for a UE would rely on SR/BSR messages from that UE. Without reception of reporting messages from a UE, It may be challenging for a gNB to know exactly the buffer status or transmission activities for that UE especially for those autonomously triggered control signaling transmission activities such as, scheduling request and PUCCH, random access procedures, sounding reference signals, etc. For those transmissions, although the UE may be allocated with dedicated control resources/occasions for transmissions, the gNB may not be able to know when those transmissions will be triggered, since the triggering conditions may be fully determined at the UE side.

As a result, the gNB configured switch points may not be well suited with respect to possible UE control signaling transmissions that are autonomously triggered by the UE, which means that those transmissions may suffer from the additional latency. For transmissions for critical services such as URLLC (Ultra Reliability Low Latency Communication) or eMBB (enhanced Mobile BroadBand) with critical latency requirements, the QoS may not be satisfied. Therefore, it may be useful to study the issue and propose corresponding solutions to address it accordingly.

According to some embodiments, methods may be provided to indicate additional UL control resources to a UE or a group of UEs that may trigger UL control signaling transmission via a gNB initiated COT structure indication signaling. Upon triggering of an uplink control signaling, the UEs may first check if there is dedicated control resource available during the indicated UL slots, if such a resource found, the UE can use it to transmit the UL control signaling, otherwise, the UE can use the additional control resource indicated by the COT structure indication to transmit the UL control signaling. In this way, the UE can achieve a relatively fast transmission of critical UL control signaling so that QoS of the corresponding services are better secured.

According to some embodiments of inventive concepts, during a gNB initiated COT, a UL critical control signaling (such as SR (Scheduling Request), PUCCH-UCI (Uplink Channel Information transmitted using a PUCCH channel), RA (Random Access) for handover, etc.) may be transmitted with relatively short latency to provide/ensure the gNB gets the UE buffer/service status on time. The gNB may make an efficient scheduling for critical services to reduce UP latency.

According to some embodiments of inventive concepts, unnecessary listen before talk or clear channel assessment may be reduced/avoided for UL control signaling transmissions.

In the following disclosure, elaboration is provided regarding factors that could be considered by the network NW (assisted by UEs) to choose the random access channel RACH access option.

Embodiments are described below in the context of NR unlicensed spectrum (NR-U), but embodiments of inventive concepts are not limited to NR-U scenarios. Embodiments of inventive concepts may also be applicable to other unlicensed operation scenarios such as LTE LAA/eLAA/feLAA.

According to some embodiments, one or multiple control channel resources (in frequency or time domain) may be indicated/included in the COT structure (e.g., using DCI signaling, RRC signaling, MAC CE signaling, etc.). The control resources may be UE specific or shared for a group UEs. The control resources may comprise, for example, at least one of the types of resources indicated below:

1) PUCCH resources, which allow UEs to transmit SR (Scheduling Request) or UCI (Uplink Control Information) on PUCCH channel if it is triggered
2) PRACH resources, which allow UEs to transmit PRACH (Physical Random Access Channel) signaling if it is triggered. The PRACH resource may be also used by a UE to transmit a PRACH-SR (a scheduling request transmitted using a PRACH channel), if that UE does not have PUCCH-SR resources/occasions available during the indicated period
3) SRS (Sounding Reference Signal) resources which allow UEs to transmit SRS if it is triggered
4) PUSCH (Physical Uplink Shared Channel) resources which allow UEs to transmit UCI signaling if it is triggered. For example, UCI may be multiplexed with data on the PUSCH.

In a variant of such embodiments, the configuration of the multiple control channel resources may not be indicated in the COT structure as part of DCI signaling, but rather the multiple control channel resources may be configured by the gNB independently of the COT structure. When the gNB indicates the presence of shared COT in DCI, the gNB provides/ensures that the duration of the shared COT is such that it includes at least one or more of the multiple control channel resources previously configured.

According to some other embodiments, the configured control resources may be combined with other configuration indicators such as UL duration and UL offset, which determine a period during which the UE applies the UL control signaling transmission. If the UE receives the COT structure indication via signaling at the slot n, the period may be configured between slots for example, the slot n+l and the slot n+l+d, where the parameter l configures the offset, while d denotes the duration. The network ensures that the period is such that it includes at least one or more of the multiple control channel resources.

According to still other embodiments, besides the COT structure indication carried by a DCI signaling (e.g., GC-PDCCH), the information on configured control resources may be also/alternatively signaled by other signaling means such as a MAC (Medium Access Control) CE (Control Element) or an RRC (Radio Resource Control) signaling.

According to yet other embodiments, if a UE receives a COT structure indication (which may be signaled by a DCI, e.g., GC-PDCCH, optionally together with other signaling means such as MAC CE and/or RRC signaling) at the subframe/slot n, the UE may take, for example, at least one of the action options indicated below to transmit uplink control signaling during the period that is indicated via the COT structure indication.

1) If the UE is triggering or has triggered at least one SR event, the UE may perform below operations sequentially to determine if there is any available SR resource/occasion during the period, Each of the below steps may be given a priority and/or may be performed sequentially in the priority order. In the following, as an example, the following priority order is provided by way of example:
   a. If there is any available dedicated PUCCH-SR resource/occasion for the UE during the period
   b. If there is any available cell specific/BWP specific RA-SR resource occasion during the period
   c. If there is any additional PUCCH-SR resource/occasion indicated via the COT structure indication signaling during the period
   d. If there is any additional RA-SR resource/occasion indicated via the COT structure indication signaling during the period In case the UE can find any available SR resource in an operation/step, the UE may stop to search SR resources in further operations/steps.

In this way, the UE may use a RA resource to signal the SR if there is no available PUCCH-SR resource during the period, for example, between the slot n+l and the slot n+l+d, although the UE may have PUCCH-SR resources available outside of this period/the COT period.

2) If the UE is triggering or has triggered at least one RA event, the UE may perform below checks sequentially to determine if there is any available RA resource/occasion during the period. In the following, as an example, the following priority order is provided by way of example:
   a. If there is any available dedicated RA resource/occasion for the UE during the period
   b. If there is any available cell specific/BWP specific RA resource occasion during the period
   c. If there is any additional RA resource/occasion indicated via the COT structure indication signaling during the period In case the UE can find any available RA resource in an operation/step, the UE may stop to search RA resources in further operations/steps.

The UE uses the selected RA resource to signal the triggered RA event during the period for example, between the slot n+l and the slot n+l+d.

3) If the UE needs to transmit SRS during the period, the UE would then check if there is an available SRS resource for the UE during the period via operations/steps below:

a. If there is dedicated SRS resource available for the UE during the period
b. If there is additional SRS resource indicated via the COT structure indication signaling during the period The UE uses the found SRS resource to transmit SRS during the period for example, between the slot n+l and the slot n+l+d.

4) If the UE needs to transmit UCI signaling, the UE may determine if there is available resource for UCI signaling via the operations/steps below:
   a. If there is a dedicated PUCCH resource available for the UE during the period
   b. If there is additional PUCCH or PUSCH resource indicated for UCI signaling via the COT structure indication signaling during the period The UE uses the found resource to transmit UCI signaling during the period for example, between the slot n+l and the slot n+l+d.

Figure 1:
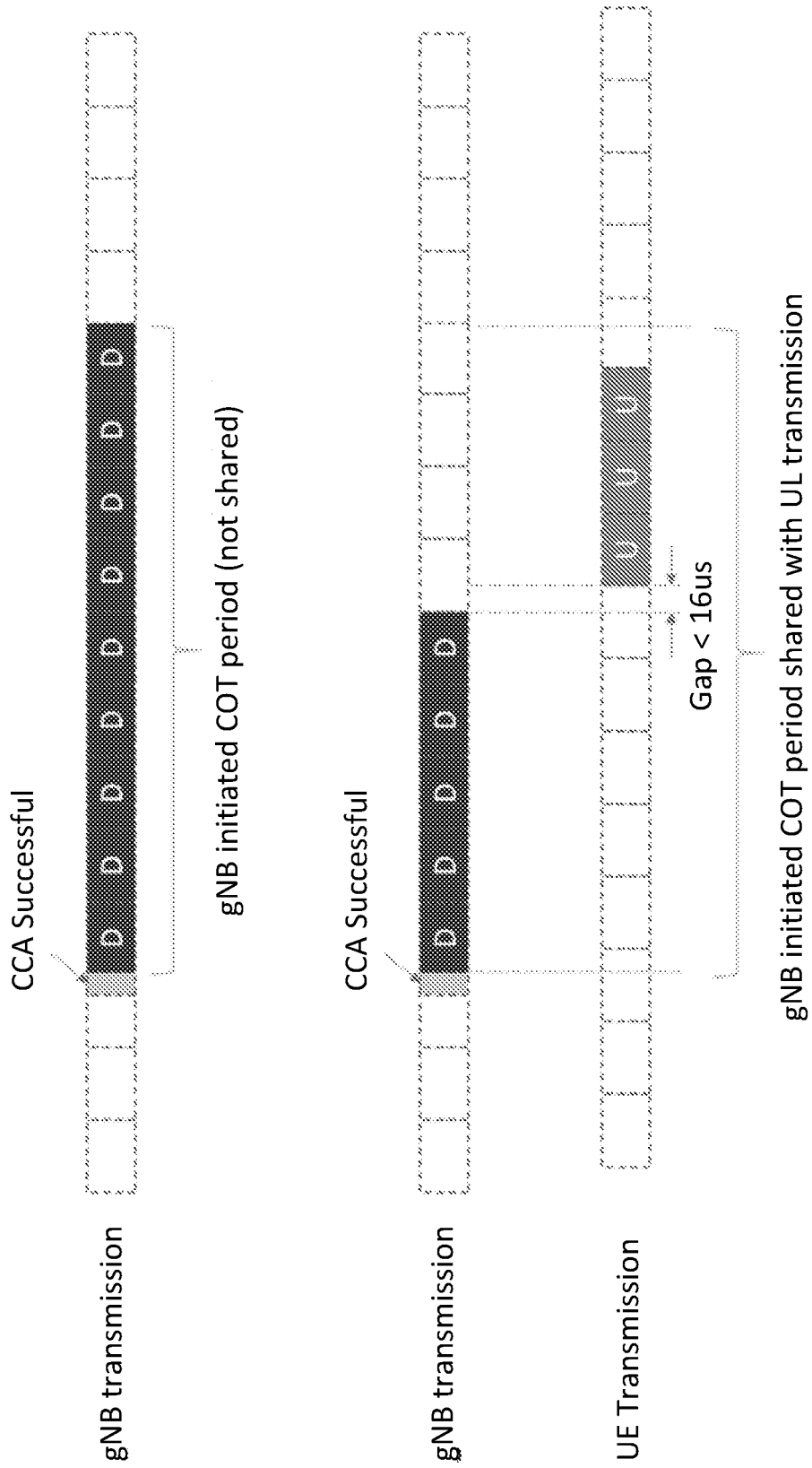
FIG. 1 is a diagram illustrating transmission opportunities both within and without COT sharing.
Figure 2:
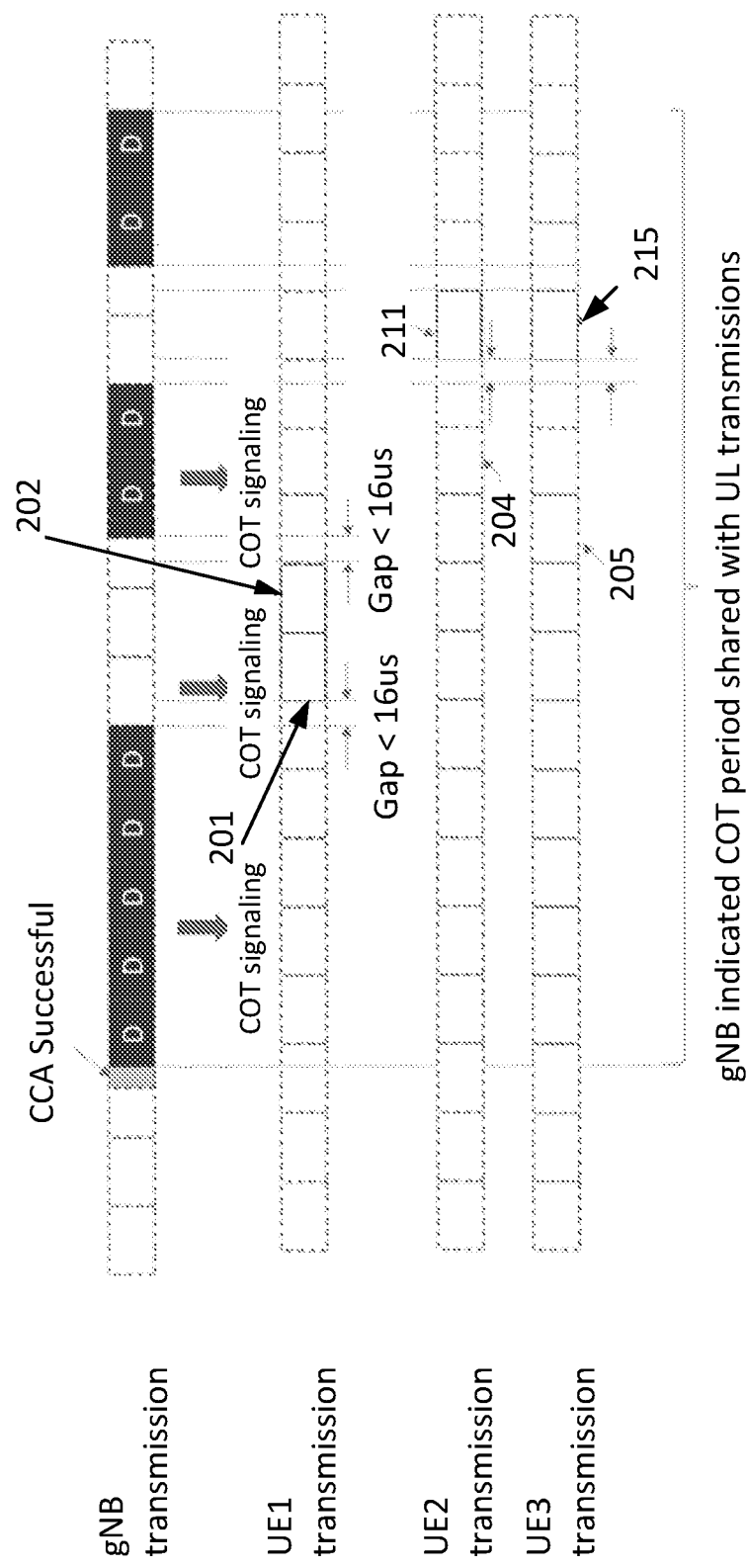
FIG. 2 is diagram illustrating a shared COT according to some embodiments of inventive concepts.

FIG. 2 illustrates an example on a shared COT, where the COT structure indication indicates UL-DL switch points and additional control resources, so UEs with uplink control signaling triggered can transmit UL signaling with those additional control resources. In this example, UE1 transmits UL data within the COT as indicated by references 201 and 202. While, UE2 has new data arrival indicated by reference 204, UE2 transmits a PUCCH-SR indicated by reference 211 with its dedicated SR resource on one indicated UL slot since UE2 has dedicated SR resource/occasion available for the indicated UL slot. UE3 has new data arrival indicated by reference 205, UE3 transmits a RA-SR 215 (a scheduling request SR transmitted using a random access RA resource) with additional RA resources indicated via COT signaling since UE3 does not have PUCCH-SR resource available in the indicated UL slot. As used herein, RA-SR and PRACH-SR may be used interchangeably where a scheduling request SR is transmitted using a random access RA resource (i.e., a PRACH channel). UE2 has a dedicated PUCCH SR resource available, and UE2 transmits PUCCH-SR 211 using the dedicated PUCCH SR resource. UE3 does not have dedicated PUCCH SR resource available, and UE3 transmits PRACH-SR 215 with additional RA resources indicated via COT signaling.

According to still further embodiments, for functionalities defined in any of the above embodiments, the function may be configured per service/LCH/LCG/RA event/PUCCH signaling type. In this way, the gNB may only configure services/RA events/PUCCH SR events/PUCCH signaling messages with critical latency requirements to apply the function, i.e., to transmit the corresponding uplink control signaling messages as early as possible. If they are triggered during a gNB initiated COT, the transmission would then occur during the same COT with the additional control resources indicated/scheduled by the COT structure indication signaling. The UE may not need to wait for the next dedicated occasion to perform transmission, which may be available outside of the current COT period. Meanwhile, for services/RA events/PUCCH-SR events without critical latency requirements, if they are triggered within a gNB initiated COT period, the UE may wait until the COT is expired and initiate the corresponding transmission on an occasion outside of the COT. In this way, additional latency may be incurred.

According to still more embodiments, the above embodiments may be performed only if the UE has data available in the UL buffer associated with certain logical channels. For example, the usage of control signaling resources in the shared COT may be allowed only if the UE has data available in the UL buffer associated with logical channels having high priority. The logical channels for which the usage of control signaling is allowed may be configured by the network.

According to some embodiments of inventive concepts, methods may thus be provided to share a gNB initiated COT with UE autonomous triggered control signaling transmissions.

Operations of a RAN node 400 (implemented using the structure of FIG. 4, also referred to as a base station) will now be discussed with reference to the flow chart of FIG. 6 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

At block 601, RAN node processing circuitry 403 may perform a clear channel assessment (CCA) with respect to a channel to be used to transmit shared Channel Occupancy Time (COT) signaling. Responsive to processing circuitry 403 determining in the CCA that the channel is idle, processing circuitry 403 may transmit COT signaling through transceiver 401 to wireless device 300 (discussed below with respect to FIG. 7) at block 603.

At block 605, processing circuitry 403 may transmit an indication of a control resource through transceiver 401 to the wireless device 300. While block 605 is shown after block 603, operations of block 605 may be performed before operations of block 603, or even before operations of block 601.

At block 609, processing circuitry 403 may transmit an indication of a shared COT switching point through transceiver 401 to wireless device 300, with the shared COT switching point defining a switch from shared COT transmission (downlink) to shared COT reception (uplink). At block 611, processing circuitry 403 may receive control signaling (through transceiver 401) from wireless device 300 using the control resource after transmitting the indication of the switching point and the indication of the control resource.

Figure 6:
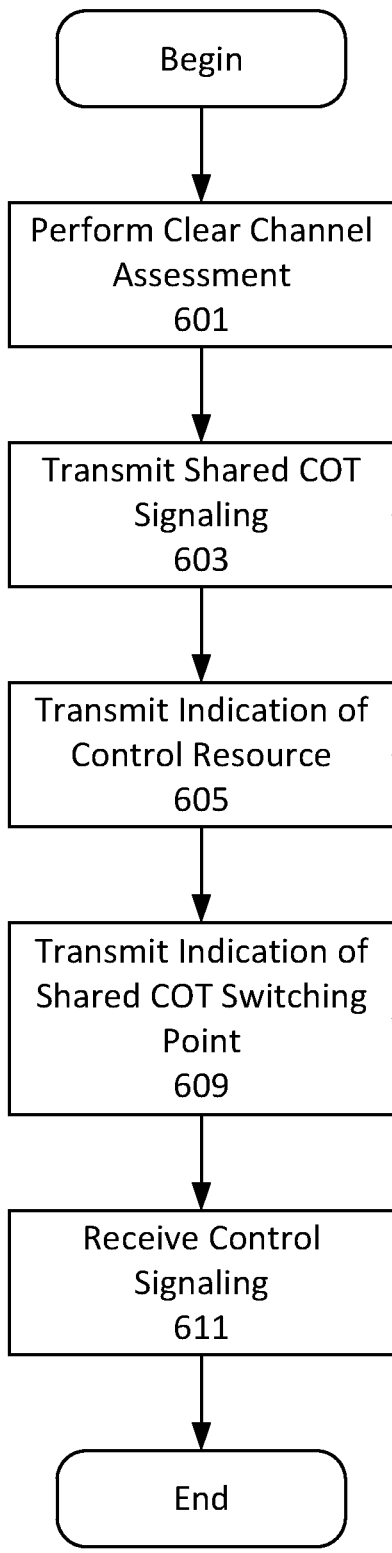
FIGS. 6 and 8 are flow charts illustrating operations of a RAN node (also referred to as a base station) according to some embodiments of inventive concepts.

Various operations from the flow chart of FIG. 6 may be optional with respect to some embodiments of RAN nodes and related methods. Regarding methods of example embodiment 39 (set forth below), for example, operations of block 601 of FIG. 6 may be optional.

Operations of the wireless device 300 (implemented using the structure of the block diagram of FIG. 3) will now be discussed with reference to the flow chart of FIG. 7 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

At block 703, wireless device processing circuitry 303 may receive shared channel occupancy time COT signaling (through transceiver 301) from RAN node 400 (corresponding to transmission of block 603 FIG. 6).

At block 705, processing circuitry 303 may receive an indication of a control resource (through transceiver 301) from RAN node 400 (corresponding to transmission of block 605 of FIG. 6). While block 705 is shown after block 703, operations of block 705 may be performed before operations of block 703.

At block 709, processing circuitry 303 may receive an indication of a shared COT switching point (through transceiver 301) from RAN node 400 (corresponding to transmission of block 609 of FIG. 6), with the shared COT switching point defining a switch from shared COT reception (downlink) to shared COT transmission (uplink). At block 711, processing circuitry 303 may transmit control signaling through transceiver 301 to RAN node 400 (corresponding to reception of block 611 of FIG. 6) using the control resource responsive to receiving the indication of the switching point and the indication of the control resource.

Figure 7:
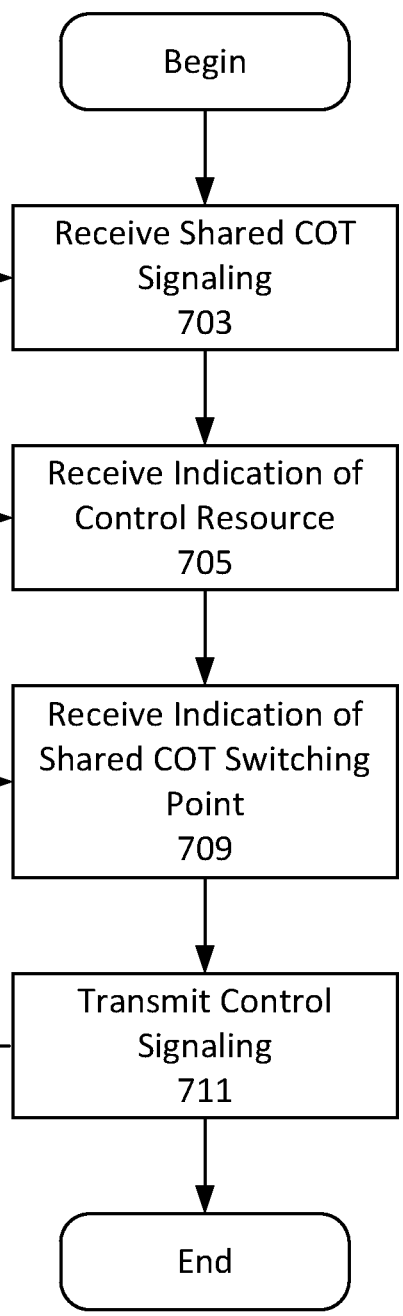
FIGS. 7 and 9 are flow charts illustrating operations of a wireless device according to some embodiments of inventive concepts.

Various operations from the flow chart of FIG. 7 may be optional with respect to some embodiments of wireless devices and related methods.

Some or all of operations of FIGS. 6 and 7 may thus be performed for/within a COT period initiated by RAN node 400 (e.g., a gNB) as discussed above for example with respect to FIG. 2. Accordingly to some embodiments, operations of blocks 603, 703, 605, 705, 609, 709, 611, and/or 711 may be performed within such a COT period. According to some other embodiments, operations of blocks 603, 703, 609, 709, 611, and/or 711 may be performed within such a COT period, and operations of blocks 605 and 705 may be performed outside (e.g., before) the COT period.

Operations of a RAN node 400 (implemented using the structure of FIG. 4) will now be discussed with reference to the flow chart of FIG. 8 according to some other embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

At block 801, RAN node processing circuitry 403 may perform a clear channel assessment (CCA) with respect to a channel used to transmit shared COT signaling. At block 803, processing circuitry 403 may transmit shared COT signaling through transceiver 401 to wireless device 300 (discussed below with respect to FIG. 9) responsive to determining in the CCA that the channel is idle.

At block 805a, processing circuitry 403 may transmit a shared COT structure indication through transceiver 401 to wireless device 300. The shared COT structure indication may include an indication for a first control resource and an indication of a shared COT switching point defining a switch from shared COT transmission (downlink) to shared COT reception (uplink).

At block 805b, processing circuitry 403 may transmit an indication outside of the shared COT structure indication for a second control resource through transceiver 401 to wireless device 300. While block 805b is shown after block 805a, operations of block 805b may be performed before operations of block 805b, before operations of block 803, or even before operations of block 801.

Responsive to uplink control signaling from wireless device 300 at block 810, processing circuitry 403 may receive the control signaling using the first or second control resource. If wireless terminal 300 transmits the control signaling using the first control resource (of block 805a), processing circuitry 403 may receive the control signaling (through transceiver 401) from wireless device 300 using the first control resource indicated using the shared COT structure indication. If wireless terminal 300 transmits the control signaling using the second control resource (of block 805b), processing circuitry 403 may receive the control signaling (through transceiver 401) from wireless device 300 using the second control resource indicated outside of the shared COT structure indication.

According to some embodiments, the first control resource (of the shared COT structure indication of block 805a) may be at least one of a physical uplink control channel signaling request (PUCCH-SR) resource and/or Random Access signaling request (RA-SR) resource and the second control resource (of the indication outside of the shared COT structure indication of block 805b) may be at least one of a dedicated PUCCH-SR resource and/or a cell/bandwidth-part (BWP)/channel/subband specific RA-SR resource.

According to some other embodiments, the first control resource (of the shared COT structure indication of block 805a) may be a Random Access (RA) resource and the second control resource (of the indication outside of the shared COT structure indication of block 805b) may be at least one of a dedicated RA resource and/or a cell/bandwidth-part (BWP)/channel/subband specific RA resource.

According to still other embodiments, the first control resource (of the shared COT structure indication of block 805a) may be a sounding reference signal (SRS) resource and the second control resource (of the indication outside of the shared COT structure indication of block 805b) may be dedicated SRS resource.

According to yet other embodiments, the first control resource (of the shared COT structure indication of block 805a) may be a physical uplink control channel (PUCCH) resource and/or a physical uplink shared channel (PUSCH) and the second control resource (of the indication outside of the shared COT structure indication of block 805b) may be a dedicated PUCCH resource.

Figure 8:
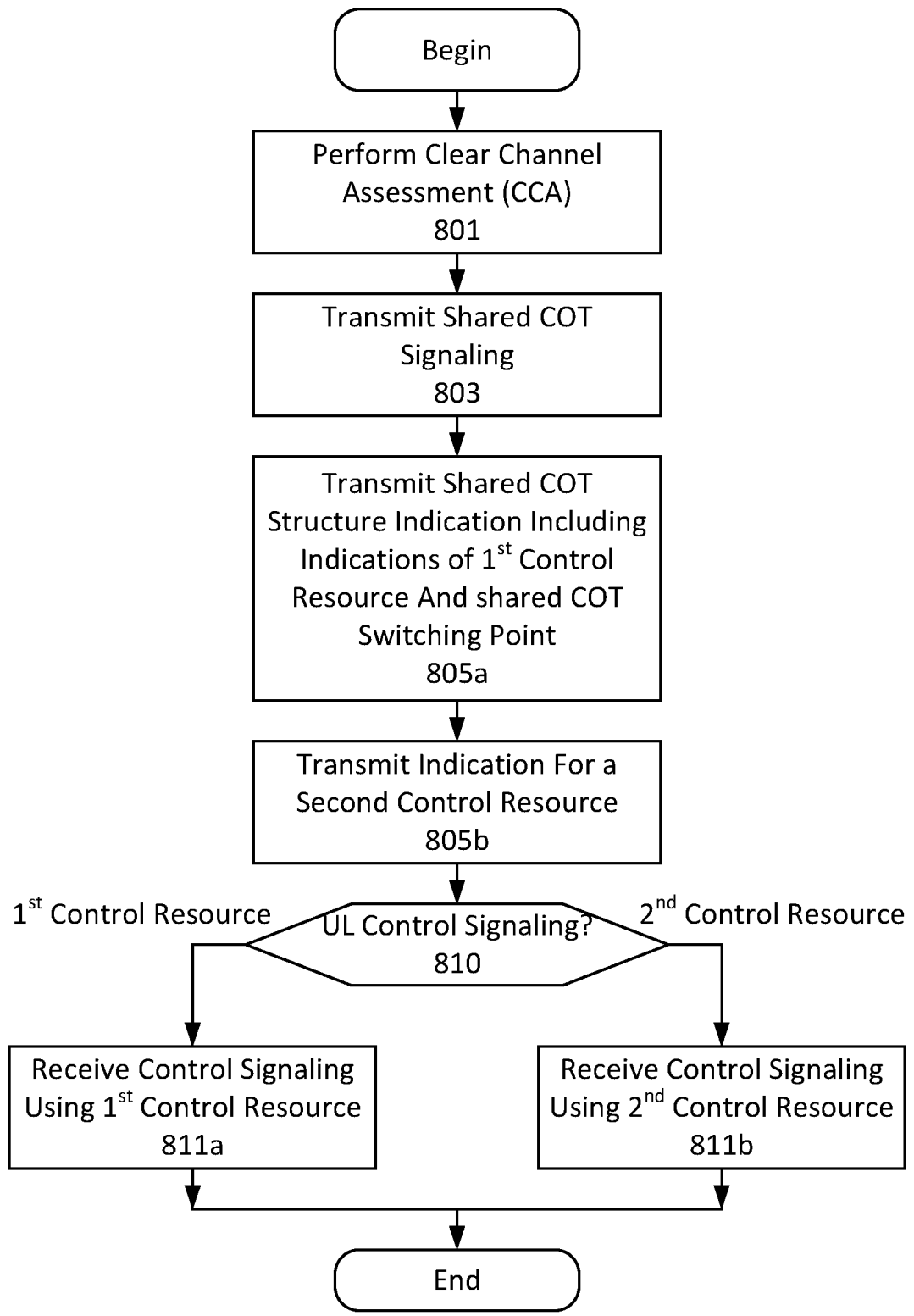

Various operations from the flow chart of FIG. 8 may be optional with respect to some embodiments of RAN nodes and related methods. Regarding methods of example embodiment 39 (set forth below), for example, operations of one or more of blocks 801, 805a, 805b, 810, 811a, and/or 811b of FIG. 8 may be optional.

Operations of the wireless device 300 (implemented using the structure of the block diagram of FIG. 3) will now be discussed with reference to the flow chart of FIG. 9 according to some embodiments of inventive concepts. For example, modules may be stored in memory 305 of FIG. 3, and these modules may provide instructions so that when the instructions of a module are executed by respective wireless device processing circuitry 303, processing circuitry 303 performs respective operations of the flow chart.

At block 903, wireless device processing circuitry 303 may receive shared channel occupancy time COT signaling from RAN node 400 (corresponding to transmission of block 803 of FIG. 8). At block 905a, processing circuitry 303 may receive a shared COT structure indication including an indication for a first control resource and including an indication of a shared COT switching point (corresponding to transmission of block 805a of FIG. 8).

At block 905b, processing circuitry 303 may receive an indication outside of the shared COT structure indication for a second control resource (corresponding to transmission of block 805b of FIG. 8). While block 905b is shown after block 905a, operations of block 905b may be performed before operations of block 905b, or even before operations of block 903.

At block 910, processing circuitry 303 may trigger control signaling, and responsive to triggering the control signaling, processing circuitry 303 may determine if the second control resource is available during a period associated with the switching point of block 905a. Responsive to the second control resource indicated outside of the shared COT structure indication being unavailable during a period associated with the switching point, processing circuitry 303 may transmit the control signaling through transceiver 301 to RAN node 400 using the first control resource indicated using the shared COT structure indication at block 911a (corresponding to reception of block 811a of FIG. 8). Responsive to the second control resource indicated outside of the shared COT structure indication being available during a period associated with the switching point, processing circuitry 303 may transmit the control signaling through transceiver 301 to RAN node 400 using the second control resource indicated outside of the shared COT structure indication at block 911b (corresponding to reception of block 811b of FIG. 8).

According to some embodiments, the first control resource (of the shared COT structure indication of block 905a) may be at least one of a physical uplink control channel signaling request (PUCCH-SR) resource and/or Random Access signaling request (RA-SR) resource and the second control resource (of the indication outside of the shared COT structure indication of block 905b) may be at least one of a dedicated PUCCH-SR resource and/or a cell/bandwidth-part (BWP)/channel/subband specific RA-SR resource.

According to some other embodiments, the first control resource (of the shared COT structure indication of block 905a) may be a Random Access (RA) resource and the second control resource (of the indication outside of the shared COT structure indication of block 905b) may be at least one of a dedicated RA resource and/or a cell/bandwidth-part (BWP)/channel/subband specific RA resource.

According to still other embodiments, the first control resource (of the shared COT structure indication of block 905a) may be a sounding reference signal (SRS) resource and the second control resource (of the indication outside of the shared COT structure indication of block 905b) may be a dedicated SRS resource.

According to yet other embodiments, the first control resource (of the shared COT structure indication of block 905a) may be a physical uplink control channel (PUCCH) resource and/or a physical uplink shared channel (PUSCH) and the second control resource (of the indication outside of the shared COT structure indication of block 905b) may be a dedicated PUCCH resource.

Figure 9:
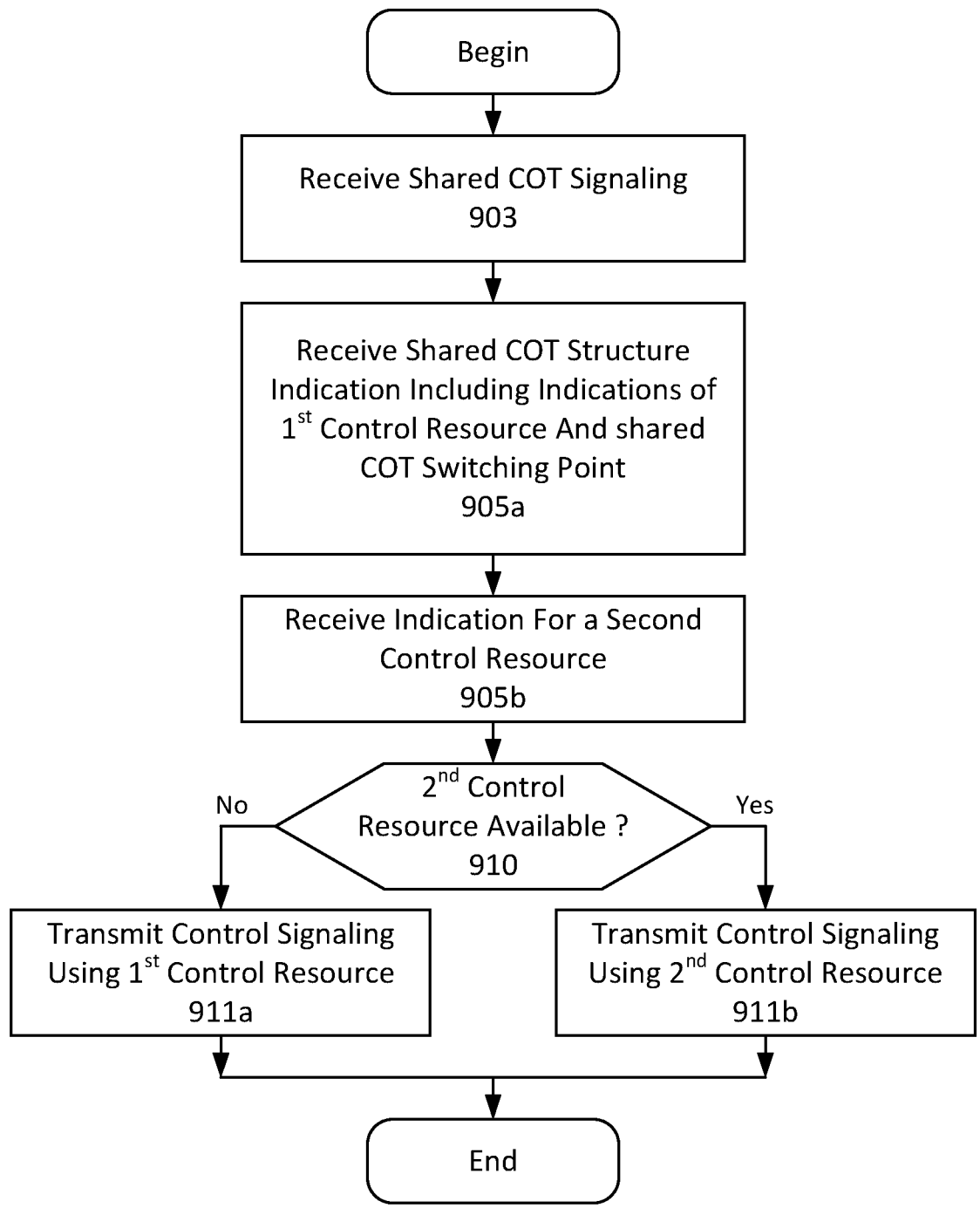

Various operations from the flow chart of FIG. 9 may be optional with respect to some embodiments of wireless devices and related methods. Regarding methods of example embodiment 1 (set forth below), for example, operations of one or more of blocks 905a, 905b, 910, 911a, and/or 911b of FIG. 9 may be optional.

Some or all of operations of FIGS. 8 and 9 may thus be performed for/within a COT period initiated by RAN node 400 (e.g., a gNB) as discussed above for example with respect to FIG. 2. Accordingly to some embodiments, operations of blocks 803, 903, 805a, 905a, 810, 910, 811a/b, and/or 911a/b may be performed within such a COT period, and operations of blocks 805b and/or 905b may be performed outside of (e.g., before) such a COT period.

Example embodiments are discussed below.

1. A method of operating a first communication device in a wireless communication network, the method comprising: receiving (703, 903) shared channel occupancy time, COT, signaling from a second communication device; receiving (705, 905a, 905b) an indication of a control resource from the second communication device; receiving (709, 905a) an indication of a shared COT switching point defining a switch from shared COT reception to shared COT transmission; and transmitting (711, 911a, 911b) control signaling to the second communication device using the control resource responsive to receiving the indication of the switching point and the indication of the control resource.

2. The method of Embodiment 1, wherein the indication of the switching point is received with the shared COT signaling from the second communication device.

3. The method of any of Embodiments 1-2, wherein the indication of the switching point is included as a part of a shared COT structure indication that is received with the shared COT signaling from the second communication device.

4. The method of Embodiment 3, wherein the shared COT structure indication further includes the indication of the control resource.

5. The method of Embodiment 4, wherein the indication of the control resource is received with at least one of downlink control channel (DCI) signaling (e.g., Group Common Physical Downlink Control Channel signaling), radio resource control (RRC) signaling, and/or medium access control (MAC) control element (CE) signaling.

6. The method of any of Embodiments 3-5, wherein the shared COT structure indication further includes at least one of an offset of the switching point and/or a slot duration available for transmission of the control signaling to the second communication device.

7. The method of any of Embodiments 1-2, wherein the indication of the control resource is received from the second communication device independently of a COT structure used for the shared COT signaling from the second communication device.

8. The method of any of Embodiments 1-7, wherein the indication of the control resource includes an indication of at least one of a physical uplink control channel (PUCCH) resource, a random access channel (RACH) resource, a sounding reference signal (SRS) resource, and/or a physical uplink shared channel (PUSCH) resource available for control signaling.

9. The method of any of Embodiments 1-8, wherein the control signaling comprises at least one of a scheduling request (SR), a sounding reference signal (SRS), a random access channel (RACH) signaling, and/or uplink control information (UCI).

10. The method of any of Embodiments 1-7, wherein the indication of the control resource includes an indication of a physical uplink control channel (PUCCH) resource, wherein the control signaling comprises at least one of a scheduling request (SR) and/or uplink control information (UCI), and wherein transmitting the control information comprises transmitting the at least one of the SR and/or UCI using the PUCCH resource.

11. The method of any of Embodiments 1-7, wherein the indication of the control resource includes an indication of a random access channel (RACH) resource, wherein the control signaling comprises RACH signaling, and wherein transmitting the control information comprises transmitting the RACH signaling using the RACH resource.

12. The method of Embodiment 11, wherein the RACH signaling comprises a RACH signaling request (RACH-SR).

13. The method of any of Embodiments 1-7, wherein the indication of the control resource includes an indication of a sounding reference signal (SRS) resource, wherein the control signaling comprises a sounding reference signal, and wherein transmitting the control information comprises transmitting the sounding reference signal using the SRS resource.

14. The method of any of Embodiments 1-7, wherein the indication of the control resource includes an indication of a physical uplink shared channel (PUSCH) resource, wherein the control signaling comprises uplink control information (UCI), and wherein transmitting the control information comprises transmitting the UCI using the PUSCH resource.

15. The method of Embodiment 14, wherein transmitting the UCI comprises transmitting the UCI multiplexed with data using the PUSCH resource.

16. The method of Embodiment 1, wherein receiving the indication of the control resource comprises receiving a shared COT structure indication including an indication for at least one of a first physical uplink control channel signaling request (PUCCH-SR) resource and/or Random Access signaling request (RA-SR) resource and receiving an indication outside of the shared COT structure indication of at least one of a dedicated PUCCH-SR resource and/or a cell/bandwidth-part (BWP)/channel/subband specific RA-SR resource, and wherein the shared COT structure indication includes the indication of the shared COT switching point.

17. The method of Embodiment 16 further comprising: triggering a scheduling request (SR) event during a shared COT period indicated by a shared COT signaling from the second communication device; wherein transmitting the control signaling comprises transmitting the control signaling using the at least one of the dedicated PUCCH-SR resource and/or cell/bandwidth-part (BWP)/channel/subband specific RA-SR resource indicated outside of the shared COT structure indication responsive to triggering the SR event and responsive to the at least one of the dedicated PUCCH-SR resource and/or cell/BWP/channel/subband specific RA-SR resource indicated outside of the shared COT structure indication being available during a period associated with the switching point.

18. The method of Embodiment 16 further comprising: triggering a scheduling request (SR) event during a shared COT period indicated by a shared COT signaling from the second communication device; wherein transmitting the control signaling comprises transmitting the control signaling using the at least one of the first PUCCH-SR resource and/or RA-SR resource indicated using the shared COT structure indication responsive to triggering the SR event and responsive to the at least one of the dedicated PUCCH-SR resource and/or cell/BWP/channel/subband specific RA-SR resource indicated outside of the shared COT structure indication being unavailable during a period associated with the switching point.

19. The method of Embodiment 1, wherein receiving the indication of the control resource comprises receiving a shared COT structure indication including an indication for at least a Random Access (RA) resource and receiving an indication outside of the shared COT structure indication of at least one of a dedicated RA resource and/or a cell/bandwidth-part (BWP)/channel/subband specific RA resource, and wherein the shared COT structure indication includes the indication of the shared COT switching point.

20. The method of Embodiment 19 further comprising: triggering a random access (RA) event during a shared COT period indicated by a shared COT signaling from the second communication device; wherein transmitting the control signaling comprises transmitting the control signaling using the at least one of the dedicated RA resource and/or a cell/BWP/channel/subband specific RA resource indicated outside of the shared COT structure indication responsive to triggering the RA event and responsive to the at least one of the dedicated RA resource and/or a cell/BWP/channel/subband specific RA resource indicated outside of the shared COT structure indication being available during a period associated with the switching point.

21. The method of Embodiment 19 further comprising: triggering a scheduling request (RA) event during a shared COT period indicated by a shared COT signaling from the second communication device; wherein transmitting the control signaling comprises transmitting the control signaling using the RA resource indicated using the shared COT structure indication responsive to triggering the RA event and responsive to the at least one of the dedicated RA resource and/or cell/BWP/channel/subband specific RA resource indicated outside of the shared COT structure indication being unavailable during a period associated with the switching point.

22. The method of Embodiment 1, wherein receiving the indication of the control resource comprises receiving a shared COT structure indication including an indication for a sounding reference signal (SRS) resource and receiving an indication outside of the shared COT structure indication of a dedicated SRS resource, and wherein the shared COT structure indication includes the indication of the shared COT switching point.

23. The method of Embodiment 22, wherein transmitting the control signaling comprises transmitting a sounding reference signal (SRS) using the dedicated SRS resource indicated outside of the shared COT structure indication responsive to the dedicated SRS resource indicated outside of the shared COT structure indication being available during a period associated with the switching point.

24. The method of Embodiment 22, wherein transmitting the control signaling comprises transmitting a sounding reference signal (SRS) using the SRS resource indicated using the shared COT structure indication responsive to the dedicated SRS resource indicated outside of the shared COT structure indication being unavailable during a period associated with the switching point.

25. The method of Embodiment 1, wherein receiving the indication of the control resource comprises receiving a shared COT structure indication including an indication for a physical uplink control channel (PUCCH) resource and/or a physical uplink shared channel (PUSCH) and receiving an indication outside of the shared COT structure indication of a dedicated PUCCH resource, and wherein the shared COT structure indication includes the indication of the shared COT switching point.

26. The method of Embodiment 25, wherein transmitting the control signaling comprises transmitting uplink channel information (UCI) using the dedicated PUCCH resource indicated outside of the shared COT structure indication responsive to the dedicated PUCCH resource indicated outside of the shared COT structure indication being available during a period associated with the switching point.

27. The method of Embodiment 25, wherein transmitting the control signaling comprises transmitting uplink channel information (UCI) using the PUCCH resource and/or PUSCH resource indicated using the shared COT structure indication responsive to the dedicated PUCCH resource indicated outside of the shared COT structure indication being unavailable during a period associated with the switching point.

28. The method of Embodiment 1, wherein receiving the indication of the control resource comprises, receiving (905a) a shared COT structure indication including an indication for a first control resource, wherein the shared COT structure indication includes the indication of the shared COT switching point, and receiving (905b) an indication outside of the shared COT structure indication for a second control resource.

29. The method of Embodiment 28, wherein transmitting the control signaling comprises transmitting (911b) the control signaling using the second control resource indicated outside of the shared COT structure indication responsive to the second control resource indicated outside of the shared COT structure indication being available during a period associated with the switching point.

30. The method of Embodiment 28, wherein transmitting the control signaling comprises transmitting (911a) the control signaling using the first control resource indicated using the shared COT structure indication responsive to the second control resource indicated outside of the shared COT structure indication being unavailable during a period associated with the switching point.

31. The method of any of Embodiments 1-30, wherein transmitting the control signaling comprises transmitting the control signaling responsive to a transmission buffer of the first communication device having data associated with a logical channel.

32. The method of Embodiment 31, wherein the logical channel has a high priority.

33. The method of any of Embodiments 1-32, wherein transmitting the control signaling comprises transmitting the control signaling responsive to the control signaling be associated with a service, logical channel, logical channel group, random access event, and/or physical uplink control channel signaling type configured by the second communication device for such control signaling transmission.

34. The method of any of Embodiments 1-33, wherein the first communication device comprises a wireless device, and wherein the second communication device comprises a Radio Access Network, RAN, node of the wireless communication network.

35. The method of Embodiment 34, wherein the RAN node comprises an eNB/gNB base station.

36. The method of any of Embodiments 1-35, wherein receiving the indication of a control resource comprises receiving indications of a plurality of control resources from the second communication device.

37. The method of Embodiment 36, wherein the indications of a plurality of control resources include indications of a plurality of physical uplink control channel (PUCCH), random access (RA), sounding reference signal (SRS), and/or physical uplink shared channel (PUSCH) control resources.

38. The method of any of Embodiments 36-37, wherein transmitting the control signaling comprises transmitting the control signaling using one of the plurality of control resources.

39. A method of operating a first communication device in a wireless communication network, the method comprising:
transmitting (603, 803) shared channel occupancy time, COT, signaling to a second communication device;
transmitting (605, 805a, 805b) an indication of a control resource to the second communication device;
transmitting (609, 805a) an indication of a shared COT switching point defining a switch from shared COT transmission to shared COT reception; and
receiving (611, 811a, 811b) control signaling from the second communication device using the control resource after transmitting the indication of the switching point and the indication of the control resource.

40. The method of Embodiment 39 further comprising: performing (601, 801) a clear channel assessment (CCA) with respect to a channel used to transmit the shared COT signaling; wherein transmitting the shared COT signaling comprises transmitting the shared COT signaling responsive to the CCA determining that the channel is idle.

41. The method of any of Embodiments 39-40, wherein the indication of the switching point is transmitted with the shared COT signaling to the second communication device.

42. The method of any of Embodiments 39-41, wherein the indication of the switching point is included as a part of a shared COT structure indication that is transmitted with the shared COT signaling to the second communication device.

43. The method of Embodiment 42, wherein the shared COT structure indication further includes the indication of the control resource.

44. The method of Embodiment 43, wherein the indication of the control resource is transmitted with at least one of downlink control channel (DCI) signaling (e.g., Group Common Physical Downlink Control Channel signaling), radio resource control (RRC) signaling, and/or medium access control (MAC) control element (CE) signaling.

45. The method of any of Embodiments 42-44, wherein the shared COT structure indication further includes at least one of an offset of the switching point and/or a slot duration available for transmission of the control signaling from the second communication device.

46. The method of any of Embodiments 39-41, wherein the indication of the control resource is transmitted to the second communication device independently of a COT structure used for the shared COT signaling to the second communication device.

47. The method of any of Embodiments 39-46, wherein the indication of the control resource includes an indication of at least one of a physical uplink control channel (PUCCH) resource, a random access channel (RACH) resource, a sounding reference signal (SRS) resource, and/or a physical uplink shared channel (PUSCH) resource available for control signaling.

48. The method of any of Embodiments 39-47, wherein the control signaling comprises at least one of a scheduling request (SR), a sounding reference signal (SRS), a random access channel (RACH) signaling, and/or uplink control information (UCI).

49. The method of any of Embodiments 39-46, wherein the indication of the control resource includes an indication of a physical uplink control channel (PUCCH) resource, wherein the control signaling comprises at least one of a scheduling request (SR) and/or uplink control information (UCI), and wherein receiving the control information comprises receiving the at least one of the SR and/or UCI using the PUCCH resource.

50. The method of any of Embodiments 39-46, wherein the indication of the control resource includes an indication of a random access channel (RACH) resource, wherein the control signaling comprises RACH signaling, and wherein receiving the control information comprises receiving the RACH signaling using the RACH resource.

51. The method of Embodiment 50, wherein the RACH signaling comprises a RACH signaling request (RACH-SR).

52. The method of any of Embodiments 39-46, wherein the indication of the control resource includes an indication of a sounding reference signal (SRS) resource, wherein the control signaling comprises a sounding reference signal, and wherein receiving the control information comprises receiving the sounding reference signal using the SRS resource.

53. The method of any of Embodiments 39-46, wherein the indication of the control resource includes an indication of a physical uplink shared channel (PUSCH) resource, wherein the control signaling comprises uplink control information (UCI), and wherein receiving the control information comprises receiving the UCI using the PUSCH resource.

54. The method of Embodiment 53, wherein receiving the UCI comprises receiving the UCI multiplexed with data using the PUSCH resource.

55. The method of Embodiment 39, wherein transmitting the indication of the control resource comprises transmitting a shared COT structure indication including an indication for at least one of a first physical uplink control channel signaling request (PUCCH-SR) resource and/or Random Access signaling request (RA-SR) resource and transmitting an indication outside of the shared COT structure indication of at least one of a dedicated PUCCH-SR resource and/or a cell/bandwidth-part (BWP)/channel/subband specific RA-SR resource, and wherein the shared COT structure indication includes the indication of the shared COT switching point.

56. The method of Embodiment 55, wherein receiving the control signaling comprises receiving the control signaling using the at least one of the dedicated PUCCH-SR resource and/or cell/bandwidth-part (BWP)/channel/subband specific RA-SR resource indicated outside of the shared COT structure indication.

57. The method of Embodiment 55, wherein receiving the control signaling comprises receiving the control signaling using the at least one of the first PUCCH-SR resource and/or RA-SR resource indicated using the shared COT structure indication.

58. The method of Embodiment 39, wherein transmitting the indication of the control resource comprises transmitting a shared COT structure indication including an indication for at least a Random Access (RA) resource and transmitting an indication outside of the shared COT structure indication of at least one of a dedicated RA resource and/or a cell/bandwidth-part (BWP)/channel/subband specific RA resource, and wherein the shared COT structure indication includes the indication of the shared COT switching point.

59. The method of Embodiment 58, wherein receiving the control signaling comprises receiving the control signaling using the at least one of the dedicated RA resource and/or a cell/BWP/channel/subband specific RA resource indicated outside of the shared COT structure indication.

60. The method of Embodiment 58, wherein receiving the control signaling comprises receiving the control signaling using the RA resource indicated using the shared COT structure indication.

61. The method of Embodiment 39, wherein transmitting the indication of the control resource comprises transmitting a shared COT structure indication including an indication for a sounding reference signal (SRS) resource and transmitting an indication outside of the shared COT structure indication of a dedicated SRS resource, and wherein the shared COT structure indication includes the indication of the shared COT switching point.

62. The method of Embodiment 61, wherein receiving the control signaling comprises receiving a sounding reference signal (SRS) using the dedicated SRS resource indicated outside of the shared COT structure indication.

63. The method of Embodiment 61, wherein receiving the control signaling comprises receiving a sounding reference signal (SRS) using the SRS resource indicated using the shared COT structure indication.

64. The method of Embodiment 39, wherein transmitting the indication of the control resource comprises transmitting a shared COT structure indication including an indication for a physical uplink control channel (PUCCH) resource and/or a physical uplink shared channel (PUSCH) and transmitting an indication outside of the shared COT structure indication of a dedicated PUCCH resource, and wherein the shared COT structure indication includes the indication of the shared COT switching point.

65. The method of Embodiment 64, wherein receiving the control signaling comprises receiving uplink channel information (UCI) using the dedicated PUCCH resource indicated outside of the shared COT structure indication.

66. The method of Embodiment 64, wherein receiving the control signaling comprises receiving uplink channel information (UCI) using the PUCCH resource and/or PUSCH resource indicated using the shared COT structure indication.

67. The method of Embodiment 39, wherein transmitting the indication of the control resource comprises, transmitting (805a) a shared COT structure indication including an indication for a first control resource, wherein the shared COT structure indication includes the indication of the shared COT switching point, and transmitting (805b) an indication outside of the shared COT structure indication for a second control resource.

68. The method of Embodiment 67, wherein receiving the control signaling comprises receiving (811b) the control signaling using the second control resource indicated outside of the shared COT structure indication.

69. The method of Embodiment 67, wherein receiving the control signaling comprises receiving (811a) the control signaling using the first control resource indicated using the shared COT structure indication.

70. The method of any of Embodiments 39-69, further comprising: configuring the second communication device for transmission of control signaling associated with a service, logical channel, logical channel group, random access event, and/or physical uplink control channel signaling type; wherein receiving the control signaling received from the second communication device comprises control signaling associated with the service, logical channel, logical channel group, random access event, and/or physical uplink control channel signaling type for which the second communication device is configured.

71. The method of any of Embodiments 39-70, wherein transmitting the indication of a control resource comprises transmitting indications of a plurality of control resources to the second communication device.

72. The method of Embodiment 71, wherein the indications of a plurality of control resources include indications of a plurality of physical uplink control channel (PUCCH), random access (RA), sounding reference signal (SRS), and/or physical uplink shared channel (PUSCH) control resources.

73. The method of any of Embodiments 71-72, wherein receiving the control signaling comprises receiving the control signaling using one of the plurality of control resources.

74. The method of any of Embodiments 39-73, wherein the first communication device comprises a Radio Access Network, RAN, node of the wireless communication network, and wherein the second communication device comprises a wireless device.

75. The method of Embodiment 74, wherein the RAN node comprises an eNB/gNB base station.

76. A wireless device (300) configured to operate in a communication network, the wireless device comprising: processing circuitry (303); and memory (305) coupled with the processing circuitry, wherein the memory includes instructions that when executed by the processing circuitry causes the wireless device to perform operations according to any of Embodiments 1-38.

77. A wireless device (300) configured to operate in a communication network, wherein the wireless device is adapted to perform according to any of Embodiments 1-38.

78. A computer program comprising program code to be executed by processing circuitry (303) of a wireless device (300) configured to operate in a communication network, whereby execution of the program code causes the wireless device (300) to perform operations according to any of embodiments 1-38.

79. A computer program product comprising a non-transitory storage medium including program code to be executed by processing circuitry (303) of a wireless device (300) configured to operate in a communication network, whereby execution of the program code causes the wireless device (300) to perform operations according to any of embodiments 1-38.

80. A radio access network, RAN, node (400) configured to operate in a communication network, the RAN node comprising: processing circuitry (403); and memory (405) coupled with the processing circuitry, wherein the memory includes instructions that when executed by the processing circuitry causes the RAN node to perform operations according to any of Embodiments 39-75.

81. A first radio access network, RAN, node (400) configured to operate in a communication network, wherein the RAN node is adapted to perform according to any of Embodiments 39-75.

82. A computer program comprising program code to be executed by processing circuitry (403) of a radio access network, RAN, node (400) configured to operate in a communication network, whereby execution of the program code causes the RAN node (400) to perform operations according to any of embodiments 39-75.

83. A computer program product comprising a non-transitory storage medium including program code to be executed by processing circuitry (403) of a radio access network, RAN, node (400) configured to operate in a communication network, whereby execution of the program code causes the RAN node (400) to perform operations according to any of embodiments 39-75.

Explanations are provided below for various abbreviations/acronyms used in the present disclosure.

| Abbreviation | Explanation |
| --- | --- |
| ACK | Acknowledgement |
| AP | Access point |
| BSR | Buffer status report |
| BW | Bandwidth |
| BWP | Bandwidth part |
| CCA | clear channel assessment |
| COT | Channel Occupancy Time |
| CSI | Channel State Information |
| CSI-RS | Channel State Information Reference Signal |
| CWS | Contention Window Size |
| DC | Dual connectivity |
| DCI | Down control information |
| DL | Downlink |
| DRS | Discovery reference signal |
| ED | energy detection |
| eMBB | enhanced Mobile broadband |
| eNB | eNodeB (an LTE base station) or enhanced Node B |
| FDD | Frequency division duplex |
| GC-PDCCH | Group common-Physical downlink control channel |
| gNB | gNodeB (a base station supporting the NR radio interface) or 5G NodeB |

-continued

| Abbreviation | Explanation |
| --- | --- |
| IE | Information Element |
| IoT | Internet of things |
| LAA | Licensed Assisted Access |
| eLAA | enhanced Licensed Assisted Access |
| feLAA | further enhanced Licensed Assisted Access |
| LBT | Listen-before-talk |
| LCH | Logical channel |
| LCG | Logical channel group |
| LTE | Long Term Evolution |
| MAC | Medium access control |
| MAC CE | MAC Control Element |
| MBB | Mobile broadband |
| MCOT | Maximum COT |
| NR | New Radio |
| NR-U | NR unlicensed |
| OFDM | Orthogonal frequency division multiplexing |
| OFDM PHYs | OFDM physical layers |
| PBCH | Physical Broadcast Channel |
| PDCCH | Physical Downlink Control Channel |
| PDU | Protocol data unit |
| PHY | Physical |
| PRACH | Physical Random Access Channel |
| PRACH-SR | Physical Random Access Channel-Scheduling Request |
| PSS | Primary synchronization signal |
| PUCCH | Physical Uplink Control Channel |
| PUCCH-SR | Physical uplink control channel-scheduling request |
| PUCCH-UCI | Physical uplink control channel-uplink control information |
| PUSCH | Physical Uplink Shared Channel |
| PUSCH-SR | Physical Uplink Shared Channel Scheduling Request |
| QoS | Quality of service |
| RA | Random access |
| RA-SR | Random access-scheduling request |
| RACH | Random Access CHannel |
| RAT | Radio Access Technology |
| RMTC | RSSI measurement timing configuration |
| RRC | Radio resource control |
| RRM | Radio Resource Management |
| RSRP | Reference Signal Received Power |
| RSRQ | Reference Signal Received Quality |
| RSSI | Received signal strength indicator |
| SFI | Slot format indicator |
| SIFS | Short interframe space |
| SR | Scheduling Request |
| SRS | Sounding Reference signal |
| SSS | Secondary synchronization signal |
| STA | Station |
| TDD | Time Division Duplex |
| Tx | Transmitter |
| TXOP | Transmission opportunity |
| UCI | Uplink Control information |
| UE | User Equipment |
| UL | Uplink |
| URLLC | Ultra reliability low latency communication |

References are identified below.

R1-1901354, "Feature lead summary for NR-U DL Signals and Channels," 3GPP TSG RAN WG1 Ad-Hoc Meeting 1901, Agenda Item 7.2.2.1.2, Taipei, 21-25 Jan. 2019.

3GPP TR 38.889 V16.0.0 (2018 December), Technical Specification Group Radio Access Network; Study on NR-based access to unlicensed spectrum (Release 16) Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
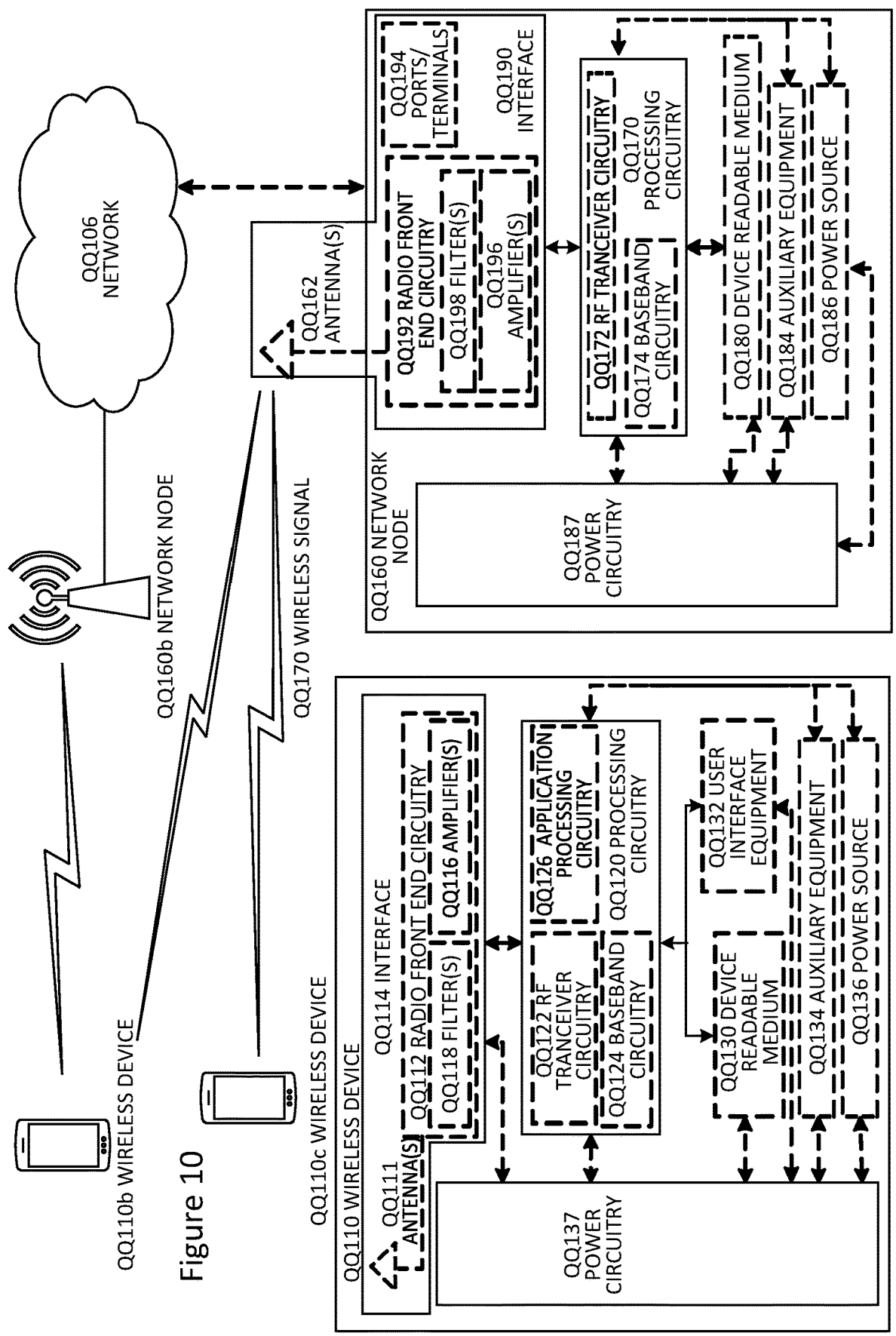
FIG. 10 is a block diagram of a wireless network in accordance with some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RANI), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190.

In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
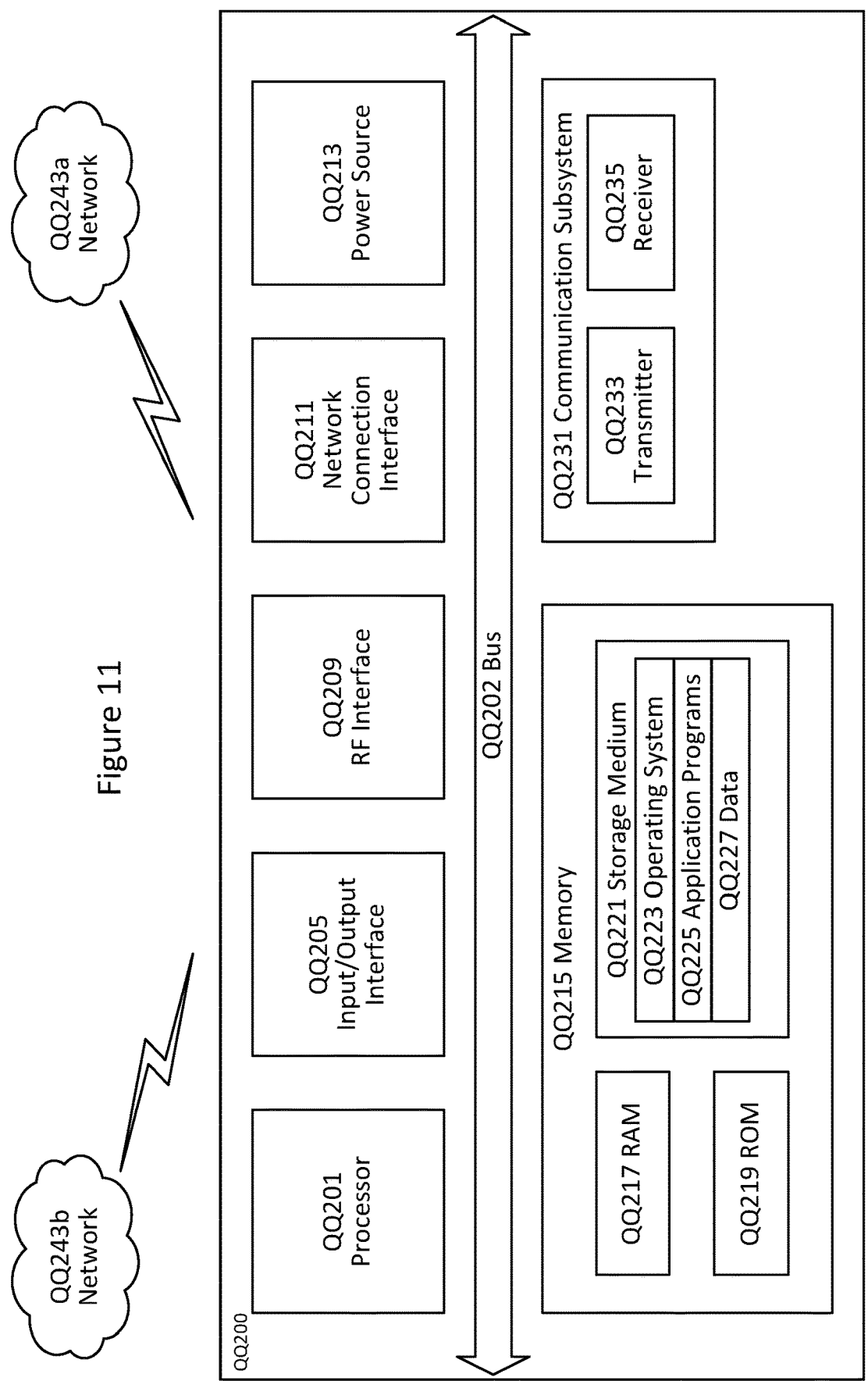
FIG. 11 is a block diagram of a user equipment in accordance with some embodiments

FIG. 11: User Equipment in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
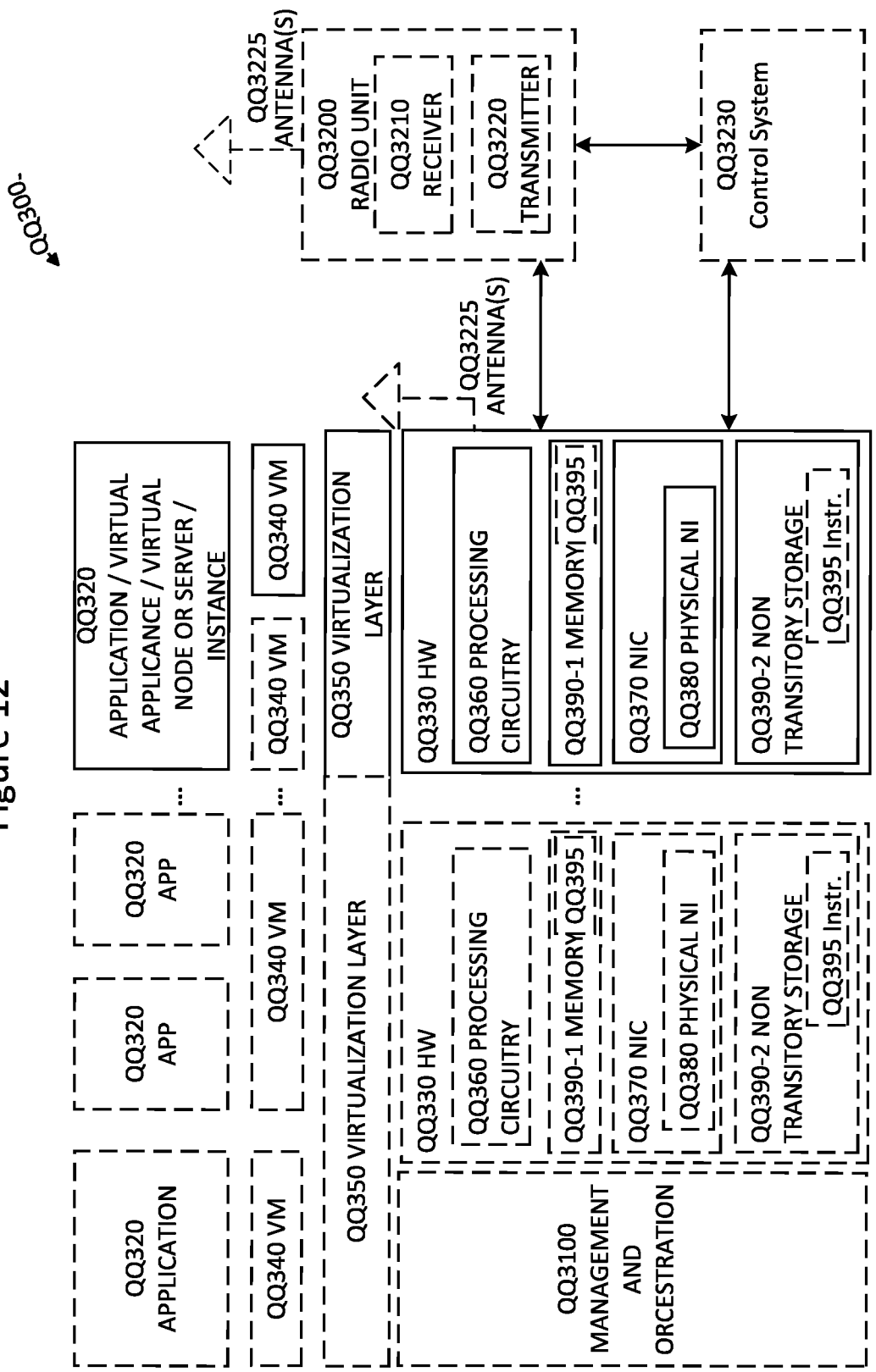
FIG. 12 is a block diagram of a virtualization environment in accordance with some embodiments.

FIG. 12: Virtualization environment in accordance with some embodiments

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 13:
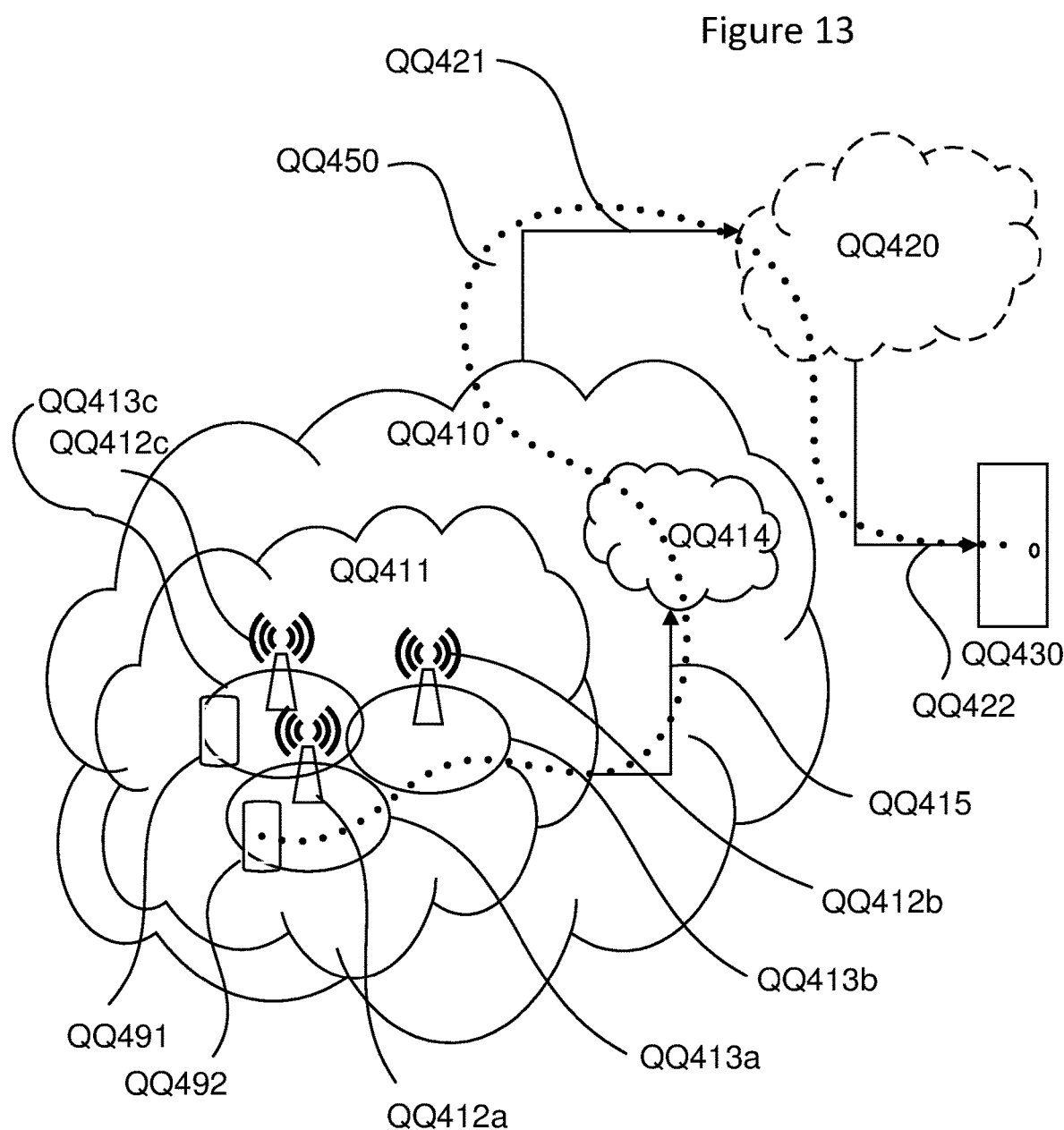
FIG. 13 is a block diagram of a telecommunication network connected via an intermediate network to a host computer in accordance with some embodiments.

FIG. 13: Telecommunication network connected via an intermediate network to a host computer in accordance with some embodiments With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 14:
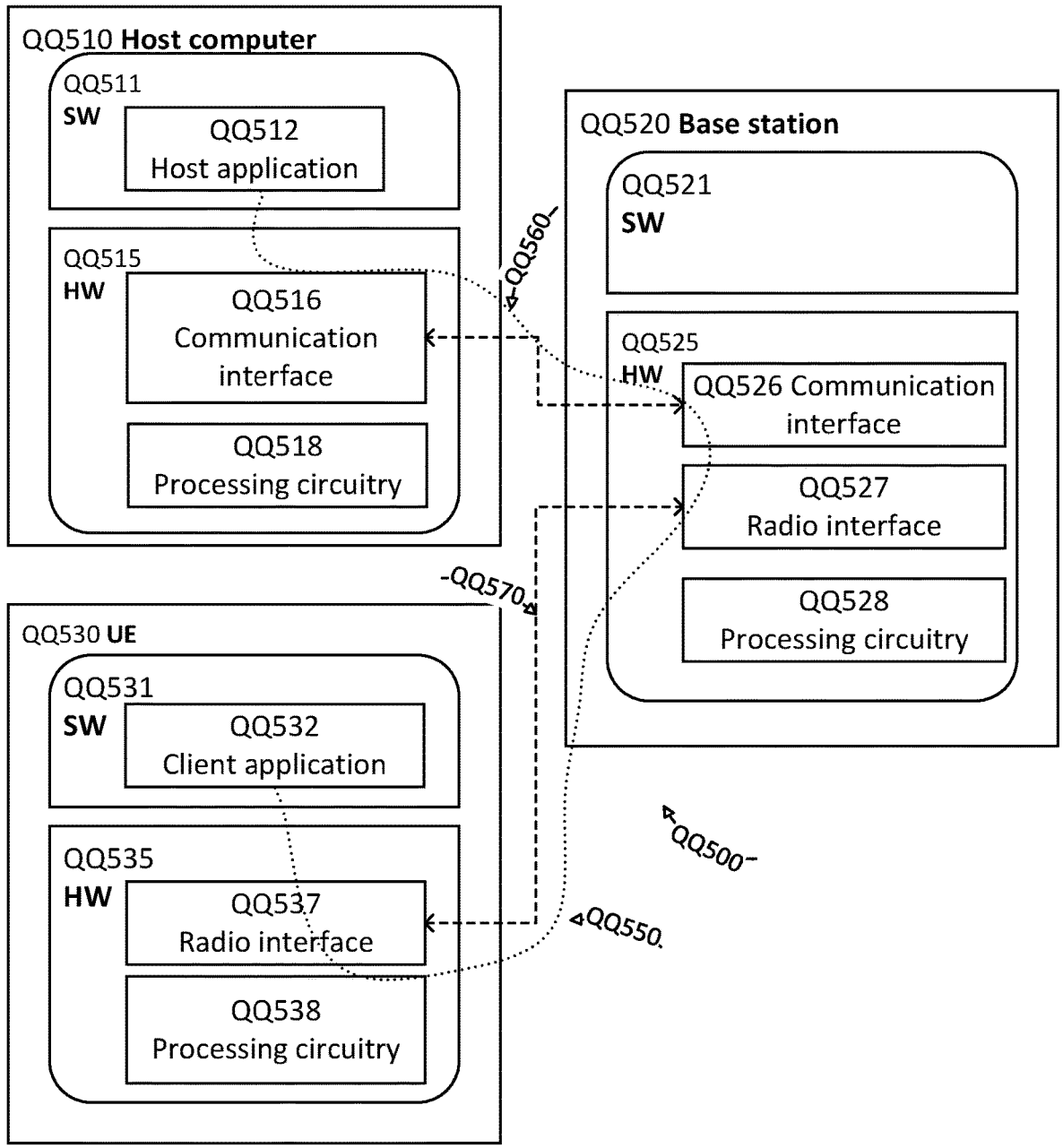
FIG. 14 is a block diagram of a host computer communicating via a base station with a user equipment over a partially wireless connection in accordance with some embodiments.

FIG. 14: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
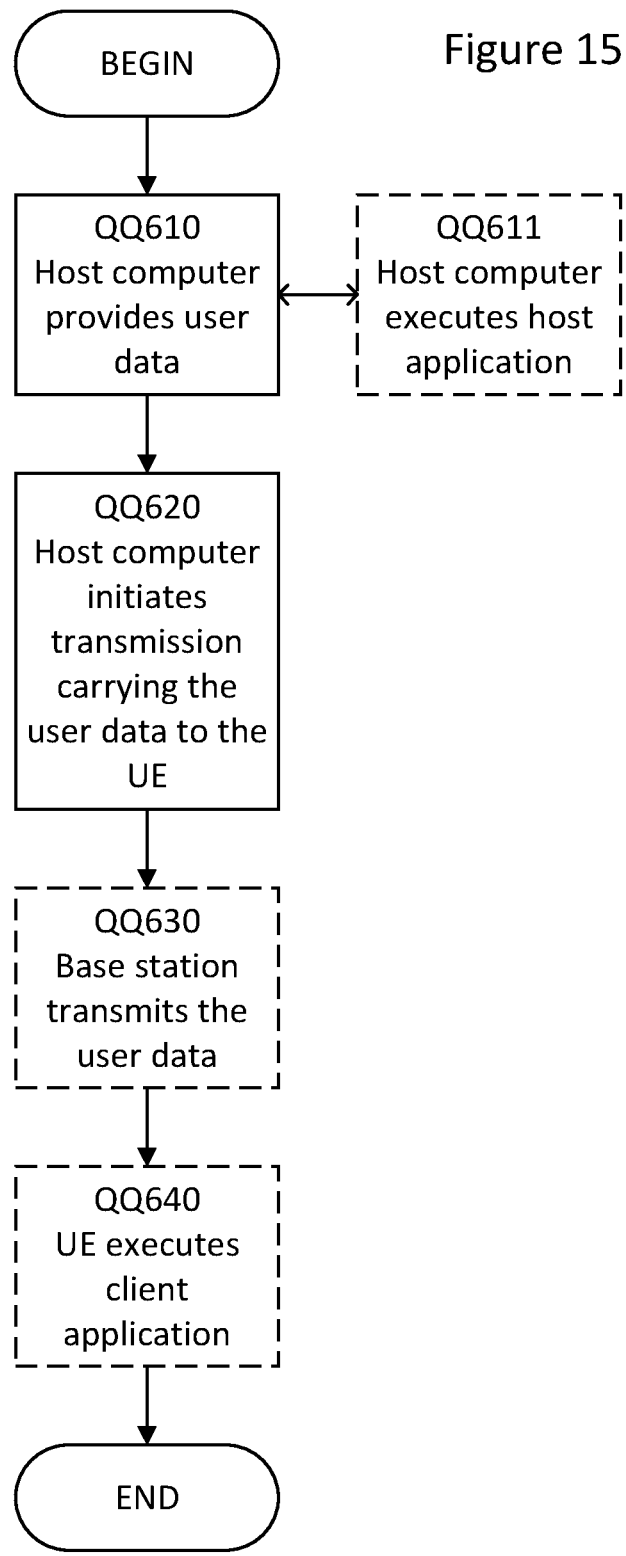
FIG. 15 is a flow chart of methods implemented in a communication system including a host computer, a base station and a user equipment in accordance with some embodiments.

FIG. 15: Methods implemented in a communication system including a host computer, a base station and a user equipment in accordance with some embodiments FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
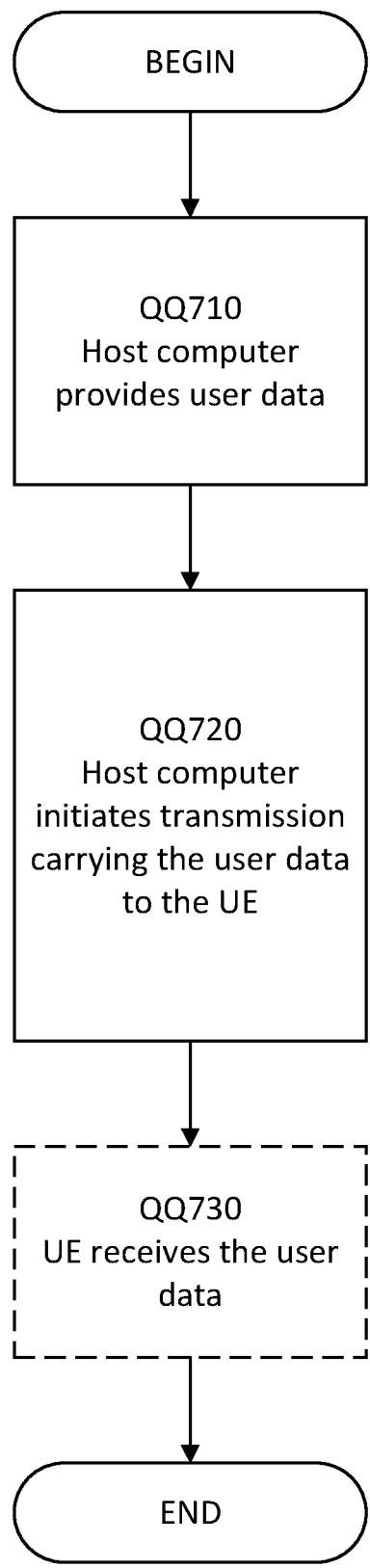
FIG. 16 is a flow chart of methods implemented in a communication system including a host computer, a base station and a user equipment in accordance with some embodiments.

FIG. 16: Methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
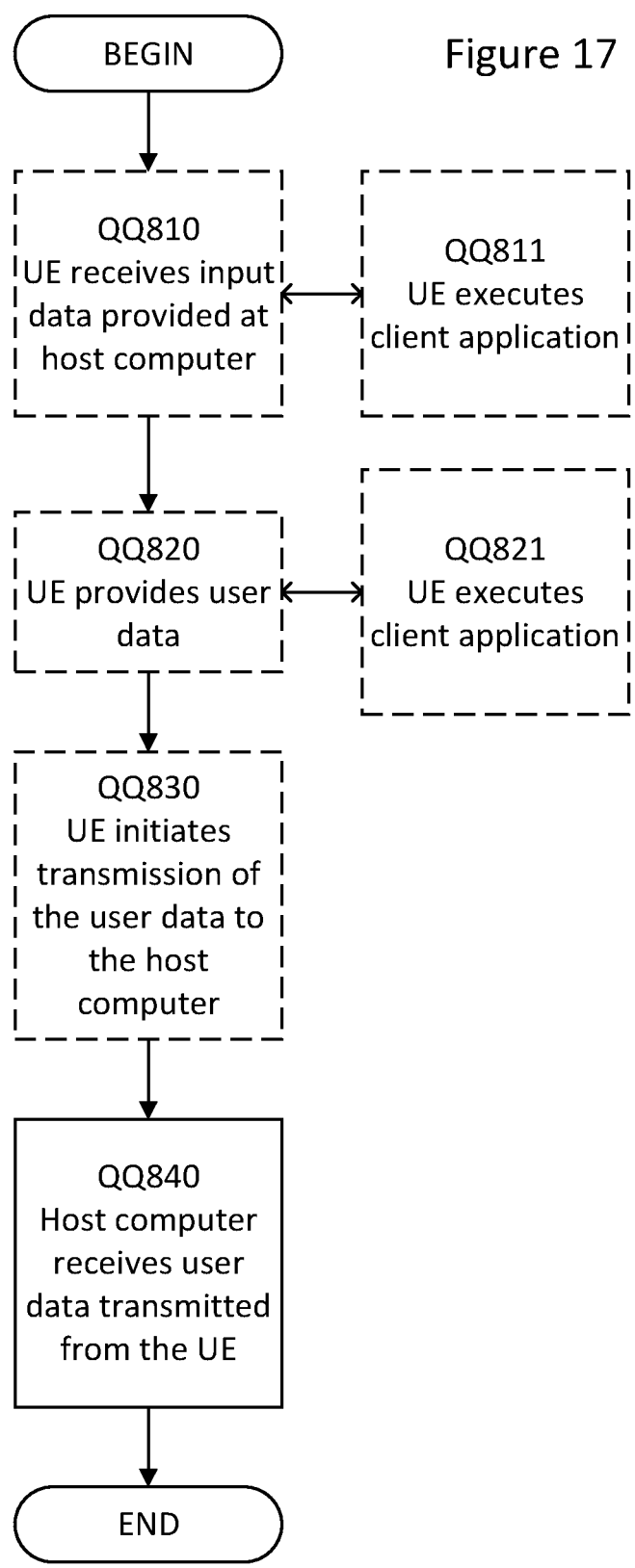
FIG. 17 is a flow chart of methods implemented in a communication system including a host computer, a base station and a user equipment in accordance with some embodiments.

FIG. 17: Methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
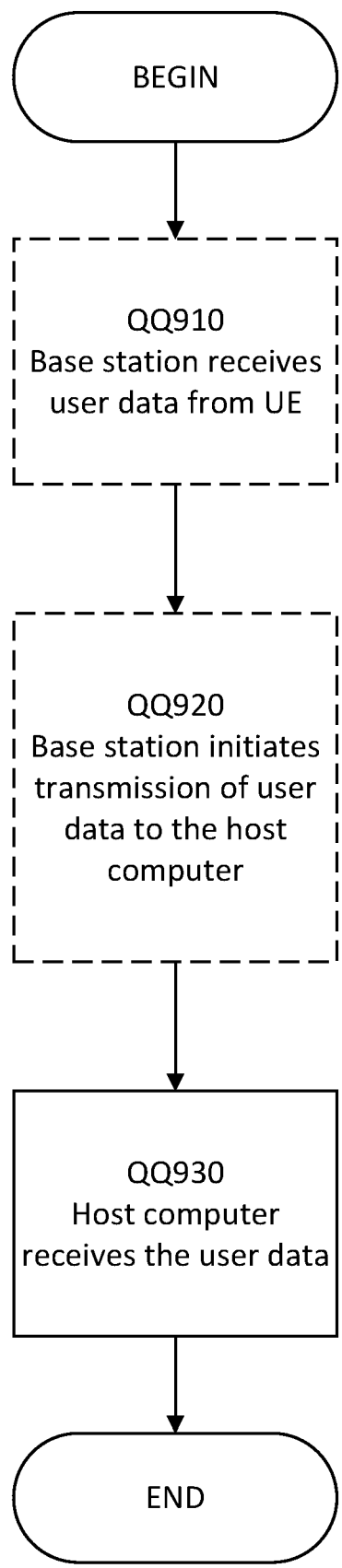
FIG. 18 is a flow chart of methods implemented in a communication system including a host computer, a base station and a user equipment in accordance with some embodiments.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3 GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device in a wireless communication network, the method comprising:
receiving shared channel occupancy time, COT, signaling from a Radio Access Network, RAN, node of the wireless communication network;
receiving an indication of a control resource from the RAN node;
receiving an indication of a shared COT switching point defining a switch from shared COT reception to shared COT transmission; and
transmitting control signaling to the RAN node using the control resource responsive to receiving the indication of the shared COT switching point and the indication of the control resource; wherein receiving the indication of the control resource comprises receiving a shared COT structure indication including an indication for a physical uplink control channel, PUCCH, resource and/or a physical uplink shared channel, PUSCH, and receiving an indication outside of the shared COT structure indication of a dedicated PUCCH resource, and wherein the shared COT structure indication includes the indication of the shared COT switching point.

2. The method of claim 1, wherein the indication of the shared COT switching point is included as a part of a shared COT structure indication that is received with the shared COT signaling from the RAN node.

3. The method of claim 2, wherein the shared COT structure indication further includes the indication of the control resource.

4. The method of claim 1, wherein receiving the indication of the control resource comprises receiving a shared COT structure indication including an indication for at least a Random Access, RA, resource and receiving an indication outside of the shared COT structure indication of at least one of a dedicated RA resource and/or a cell/bandwidth-part, BWP/channel/subband specific RA resource, and wherein the shared COT structure indication includes the indication of the shared COT switching point.

5. The method of claim 1, wherein transmitting the control signaling comprises transmitting uplink channel information, UCI, using the dedicated PUCCH resource indicated outside of the shared COT structure indication responsive to the dedicated PUCCH resource indicated outside of the shared COT structure indication being available during a period associated with the switching point.

6. A wireless device comprising:
processing circuitry; and
memory coupled with the processing circuitry, wherein the memory includes instructions that when executed by the processing circuitry causes the wireless device to,
receive shared channel occupancy time, COT, signaling from a Radio Access Network, RAN, node of a wireless communication network,
receive an indication of a control resource from the RAN node,
receive an indication of a shared COT switching point defining a switch from shared COT reception to shared COT transmission, and
transmit control signaling to the RAN node using the control resource responsive to receiving the indication of the shared COT switching point and the indication of the control resource; wherein receiving the indication of the control resource comprises receiving a shared COT structure indication including an indication for a physical uplink control channel, PUCCH, resource and/or a physical uplink shared channel, PUSCH, and receiving an indication outside of the shared COT structure indication of a dedicated PUCCH resource, and wherein the shared COT structure indication includes the indication of the shared COT switching point.

7. The wireless device of claim 6, wherein the indication of the shared COT switching point is included as a part of a shared COT structure indication that is received with the shared COT signaling from the RAN node.

8. The wireless device of claim 7, wherein the shared COT structure indication further includes the indication of the control resource.

9. The wireless device of claim 6, wherein receiving the indication of the control resource comprises receiving a shared COT structure indication including an indication for at least a Random Access, RA, resource and receiving an indication outside of the shared COT structure indication of at least one of a dedicated RA resource and/or a cell/bandwidth-part, BWP/channel/subband specific RA resource, and wherein the shared COT structure indication includes the indication of the shared COT switching point.

10. The wireless device of claim 6, wherein transmitting the control signaling comprises transmitting uplink channel information, UCI, using the dedicated PUCCH resource indicated outside of the shared COT structure indication responsive to the dedicated PUCCH resource indicated outside of the shared COT structure indication being available during a period associated with the switching point.

11. The wireless device of claim 6, wherein transmitting the control signaling comprises transmitting uplink channel information, UCI, using the PUCCH resource and/or PUSCH resource indicated using the shared COT structure indication responsive to the dedicated PUCCH resource indicated outside of the shared COT structure indication being unavailable during a period associated with the switching point.

* * * * *